Sept. 27, 1966     D. J. ROTH ETAL     3,275,498
PULP MOLDING MACHINE

Filed July 12, 1963     17 Sheets-Sheet 5

INVENTORS
DONALD J. ROTH
HAROLD V. KINDSETH
JEAN E. ZELLER

BY Moore, White & Burd
ATTORNEYS

Sept. 27, 1966  D. J. ROTH ET AL  3,275,498
PULP MOLDING MACHINE
Filed July 12, 1963  17 Sheets-Sheet 6

INVENTORS
DONALD J. ROTH
HAROLD V. KINDSETH
JEAN E. ZELLER
BY Moore, White & Burd
ATTORNEYS INVENTORS
DONALD J. ROTH
HAROLD V. KINDSETH
JEAN E. ZELLER
BY Moore, White & Burd
ATTORNEYS

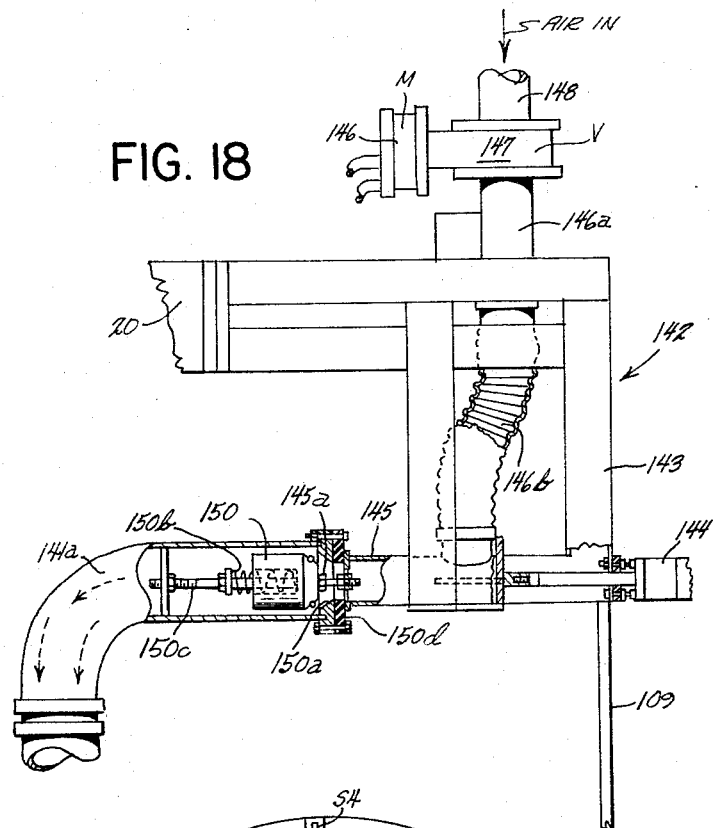
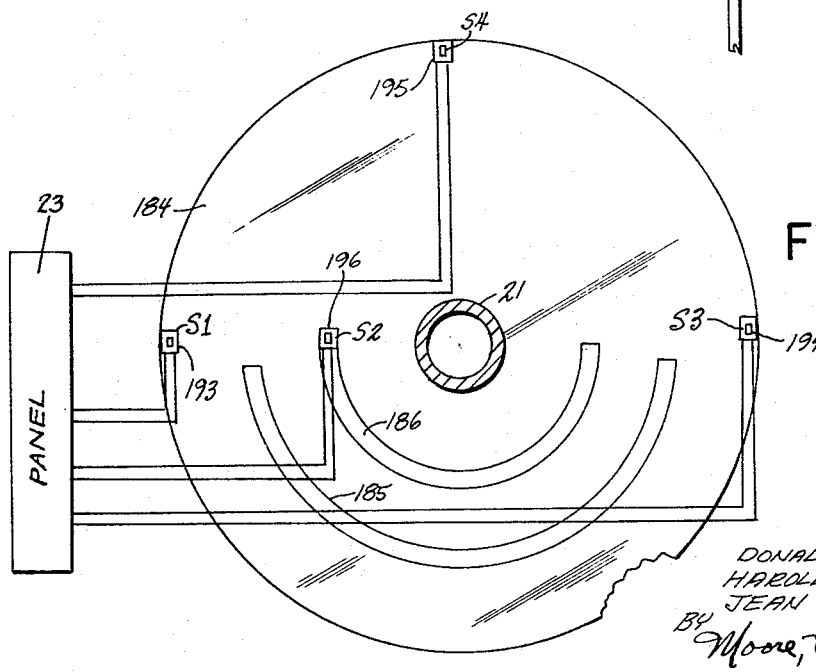

Sept. 27, 1966     D. J. ROTH ETAL     3,275,498
PULP MOLDING MACHINE
Filed July 12, 1963     17 Sheets-Sheet 9
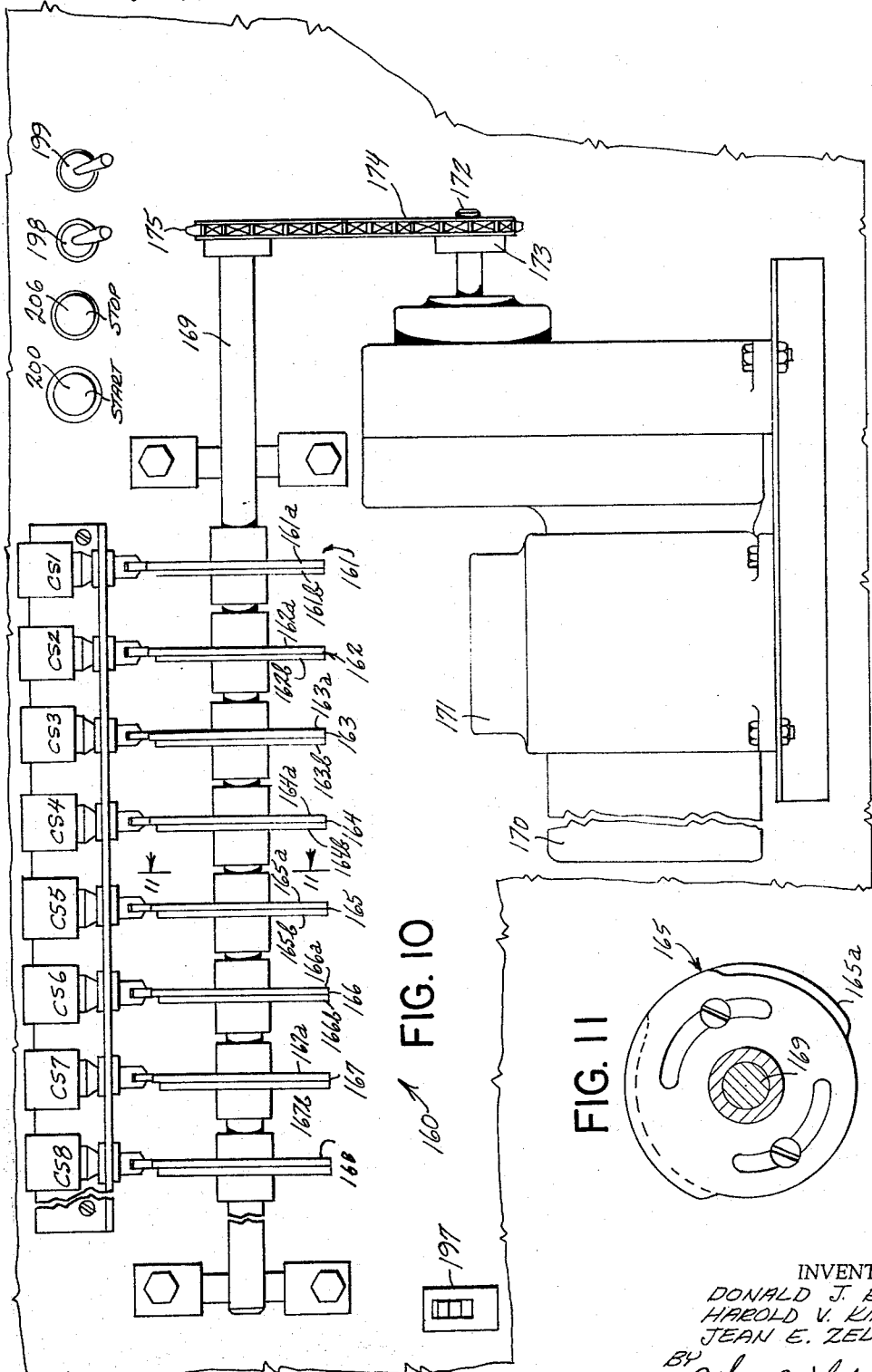
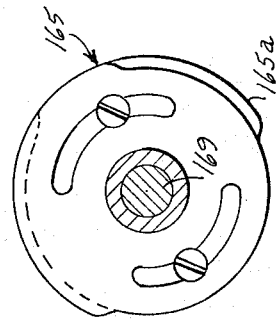
INVENTORS
DONALD J. ROTH
HAROLD V. KINDSETH
JEAN E. ZELLER
BY Moore, White & Burd
ATTORNEYS

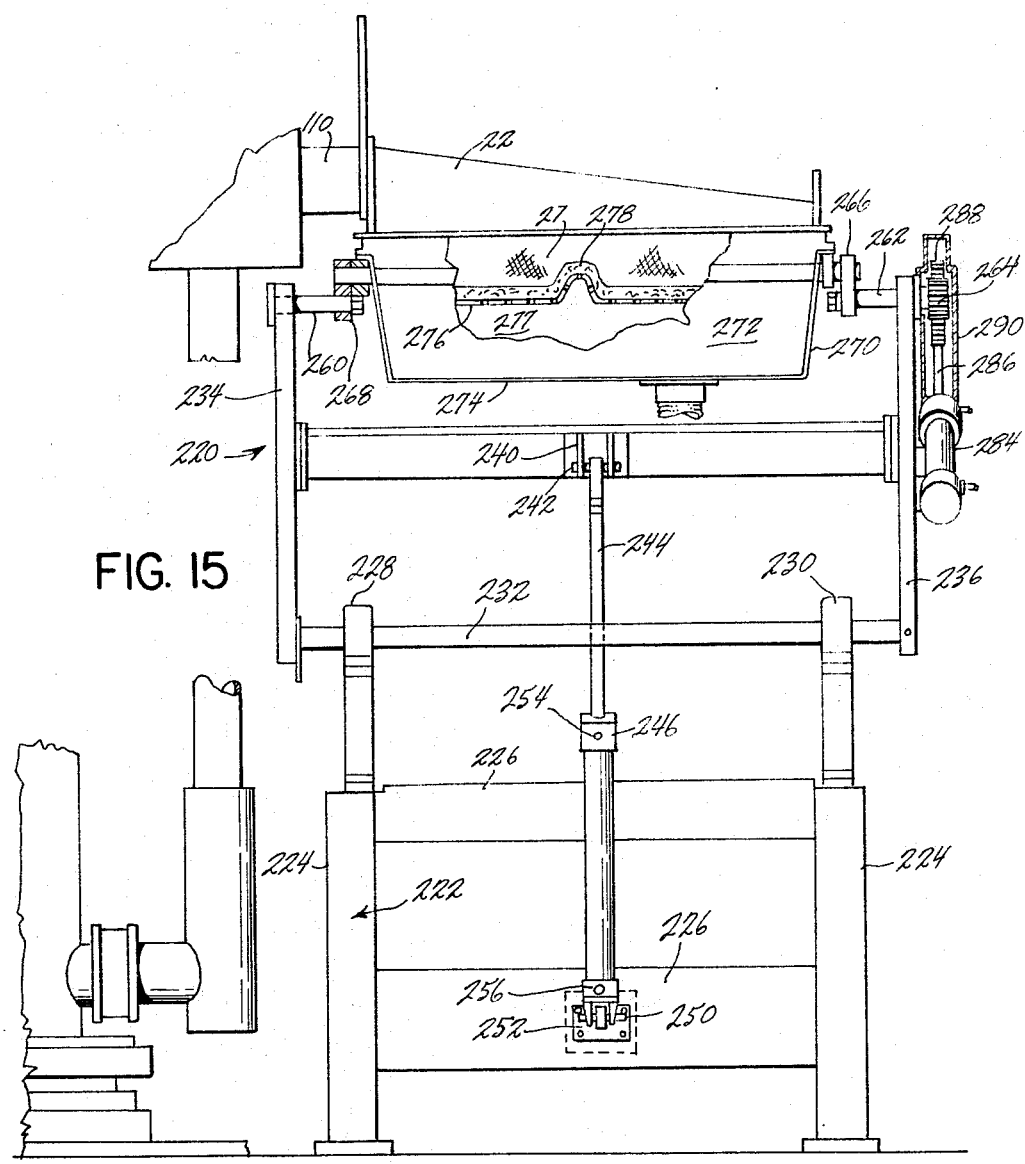

Sept. 27, 1966
D. J. ROTH ETAL
3,275,498
PULP MOLDING MACHINE
Filed July 12, 1963
17 Sheets-Sheet 14
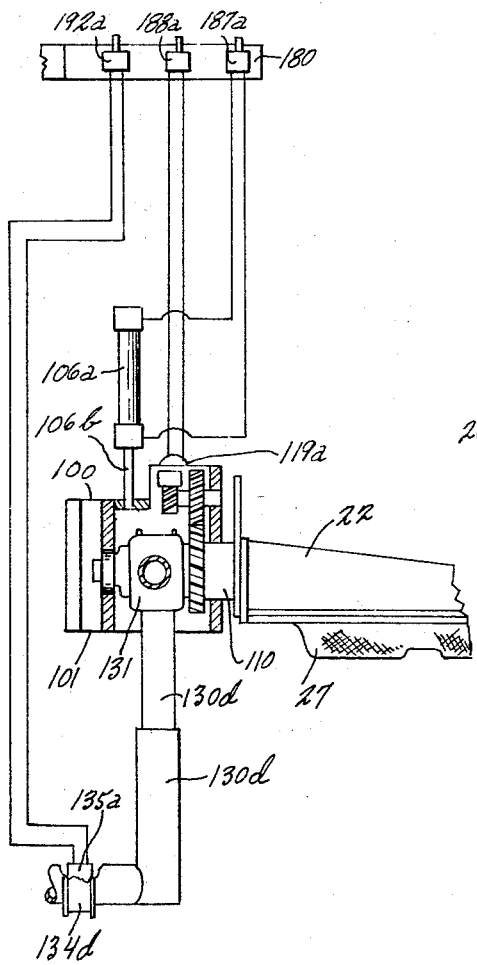
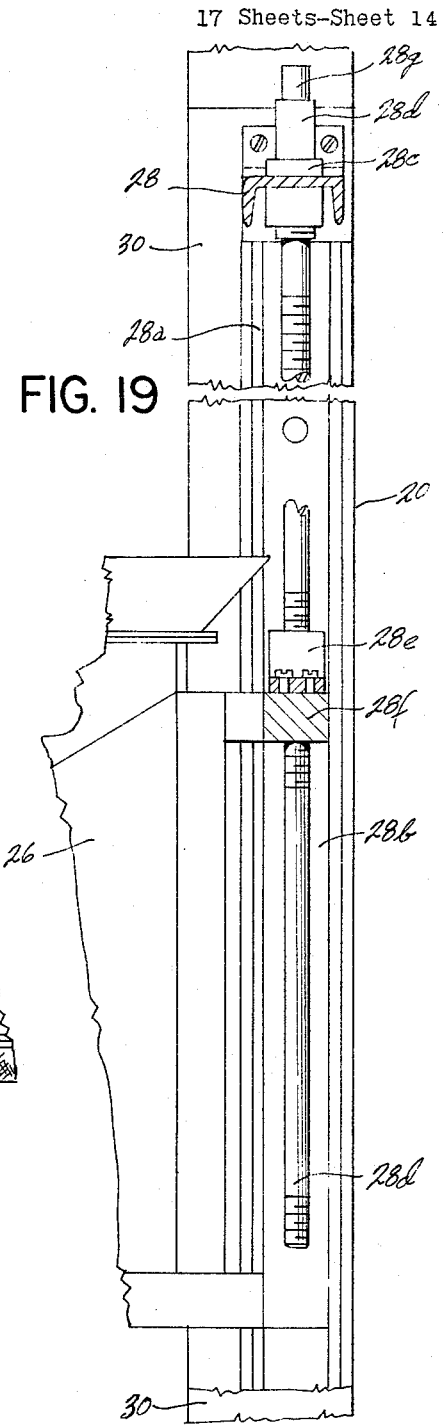
INVENTORS
DONALD J. ROTH
HAROLD V. KINDSETH
JEAN E. ZELLER
BY Moore, White & Lund
ATTORNEYS Sept. 27, 1966 D. J. ROTH ETAL 3,275,498
PULP MOLDING MACHINE
Filed July 12, 1963 17 Sheets-Sheet 15

INVENTORS
DONALD J. ROTH
HAROLD V. KINDSETH
JEAN E. ZELLER
BY Moore, White & Bund
ATTORNEYS

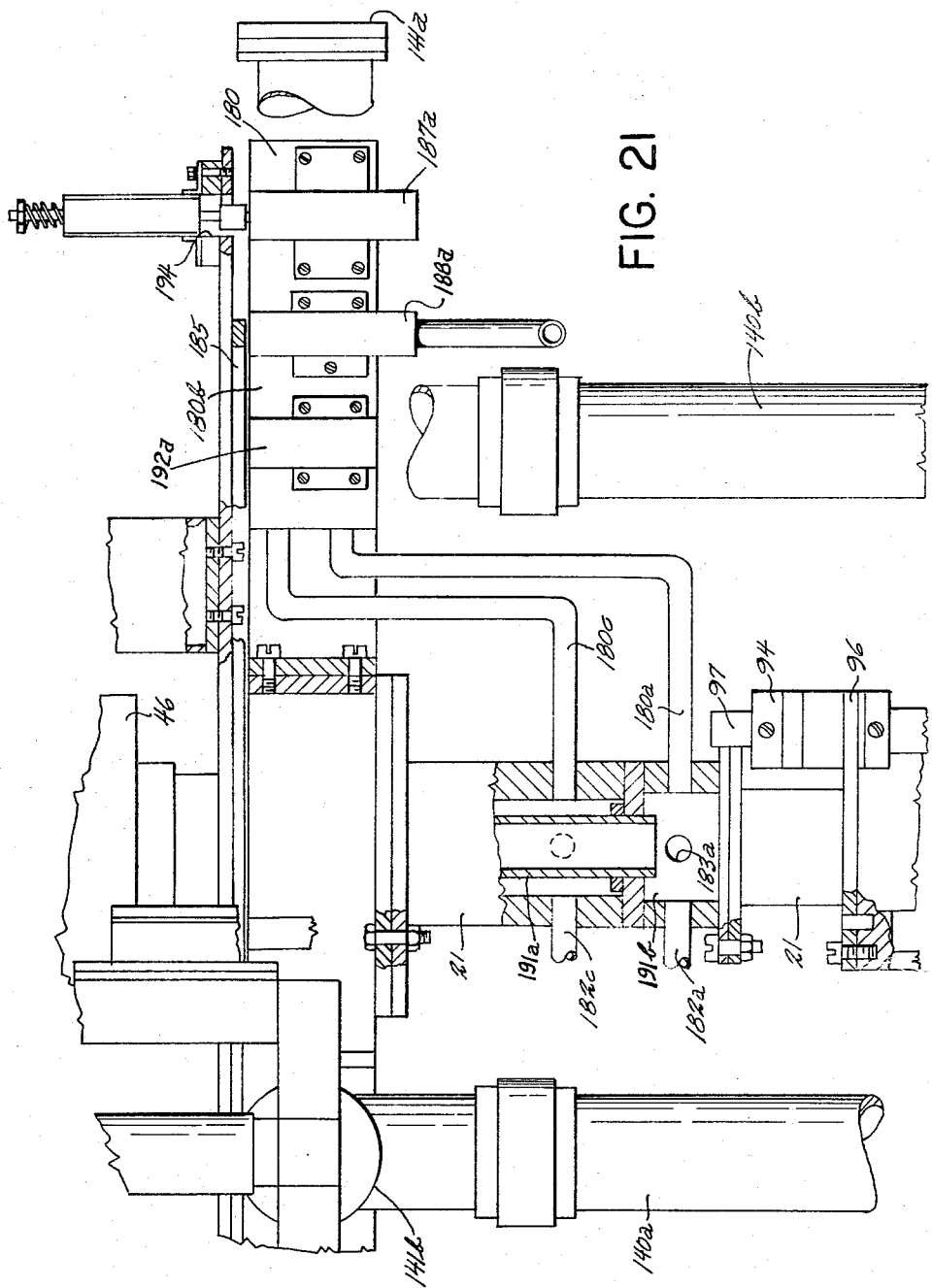

Sept. 27, 1966  D. J. ROTH ETAL  3,275,498
PULP MOLDING MACHINE
Filed July 12, 1963  17 Sheets-Sheet 17
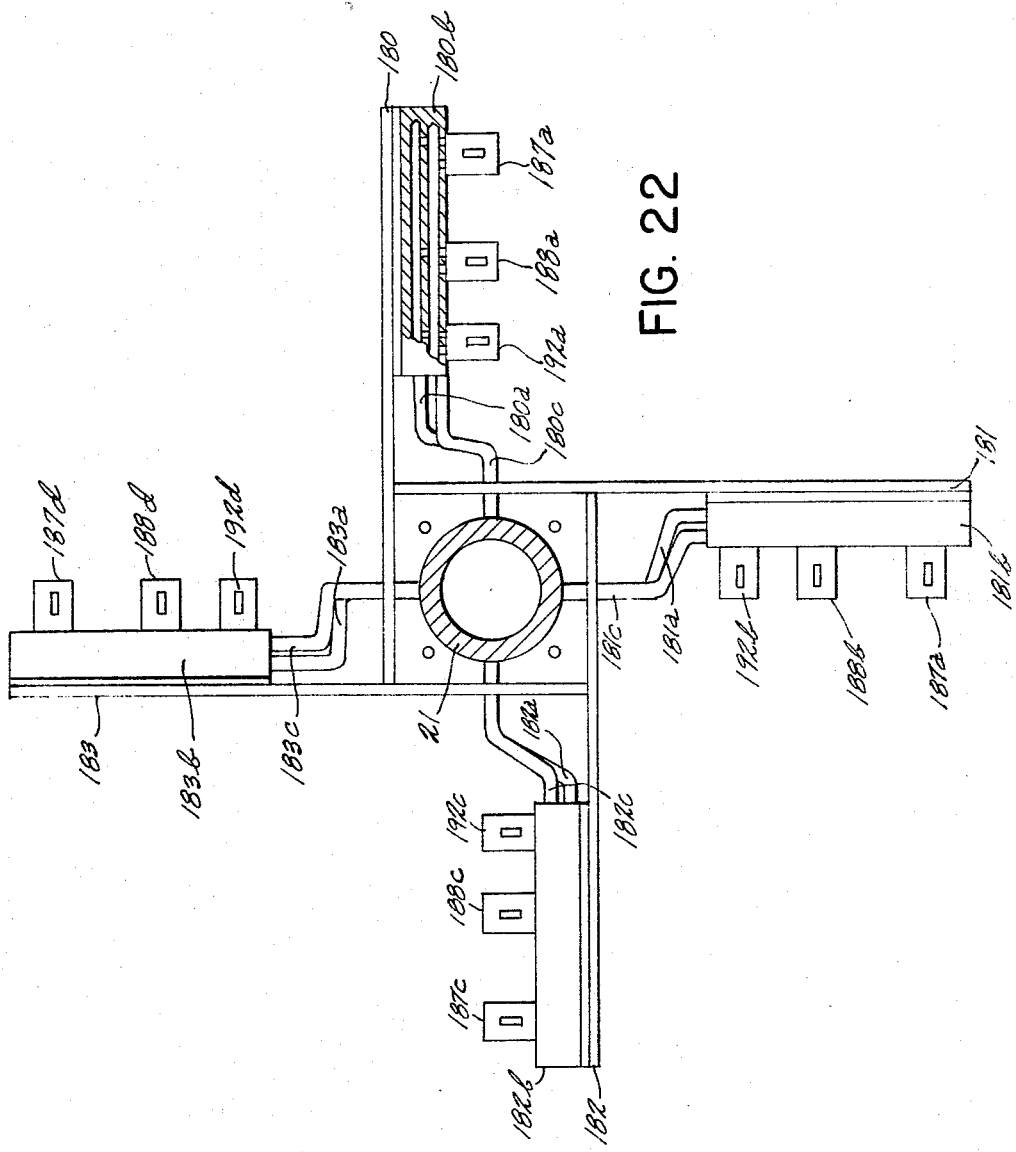
INVENTORS
DONALD J. ROTH
HAROLD V. KINDSETH
JEAN E. ZELLER
BY Moore, White & Burd
ATTORNEYS United States Patent Office 3,275,498
Patented Sept. 27, 1966

3,275,498
PULP MOLDING MACHINE
Donald J. Roth, St. Paul, Minn., Jean E. Zeller, Muskegon, Mich., and Harold V. Kindseth, Minneapolis, Minn., assignors to Bemis Bro. Bag Co., Minneapolis, Minn., a corporation of Missouri
Filed July 12, 1963, Ser. No. 301,929
15 Claims. (Cl. 162—253)

The present invention relates to the molding art and more particularly to the art of molding articles from an aqueous slurry by vacuum deposition.

Numerous machines have been previously proposed for molding articles from aqueous slurries composed, for example, of cellulosic pulp suspensions. These prior machines have, however, suffered from various shortcomings. One of the important disadvantages of many existing pulp molding machines results from the fact that the molding form moves laterally through the pulp suspension during the molding process. This movement often tends to thicken the leading edge of the molded pulp product as it travels through the slurry. A further disadvantage of such movement through the pulp suspension is the formation of uneven edges on the molded pulp product which sometimes require trimming after removal from the mold.

A further disadvantage of many existing pulp molding machines is the relatively slow movement of the mold into and out of the slurry, the speed being dictated by the length of time the molded product must be maintained in the slurry. This condition exists, for example, in the type of machine wherein the molds are mounted upon the circumference of a large wheel adapted to rotate about a horizontal axis. Because of this limitation, the speed of the mold cannot readily be increased beyond a relatively slow rate if sufficient time is to be allowed for the deposition of pulp upon the mold. A further disadvantage of low speed mold movement is that relatively little time is allowed for drainage and drying of the parts on the mold. This in turn causes the moisture in finished parts to be excessive.

Still another disadvantage of many of the existing pulp molding machines is that the period of time which the mold remains in the slurry can be adjusted only by changing the speed of operation of the entire machine. If the machine speed is changed, the duration of each of the other processes occurring on the machine such as the washing of the molds and transfer of the molded parts from the molding machine to an oven or the like must also change. This condition again is frequently undesirable.

Yet another disadvantage of many of the existing pulp molding machines is that the water which passes through the openings in the mold during deposition of pulp must flow upwardly through the machine during a substantial portion of time in which suction is applied through the mold. This occurrence will reduce the effectiveness of the vacuum and increases the time required for effective water removal.

A still further disadvantage of many present machines is that the same air lines are utilized for both drawing water into the mold during the formation of a part and also to provide air for removing the molded part from the surface of the mold. There is a significant disadvantage in this system in that a part of the moist air which is drawn off through the mold during the formation cycle is reintroduced into the article when the removal air is supplied.

A still further disadvantage of most present pulp molding machines is that they are frequently poorly suited for molding articles from widely different pulp compositions since the timing of various operations such as the application of vacuum, the initiation of part transfer, the duration of the mold washing operation cannot be changed independently.

Another disadvantage of many prior pulp molding machines is that the water spray used to clean the molds cannot be confined. Thus, a certain amount of water is frequently allowed to escape and fall into the slurry tank or onto the floor.

In view of these and other defects of the prior art it is one object of the present invention to provide an improved pulp molding machine which includes a provision for allowing the timing of various operational steps to be varied independently as required whereby slurries of different composition and consistencies can be handled with equal ease.

Still another object of the present invention is the provision of an improved pulp molding machine having a means for allowing vacuum to be applied to each mold for any selected period of time so that the weight of the molded piece can be accurately controlled.

A further object of the present invention is the provision of an improved pulp molding machine wherein the mold is introduced into the slurry along a vertical path, held stationary during the deposition of fiber thereon and retracted from the slurry along a vertical path whereby variations in wall thickness of the molded piece can be reliably maintained within predetermined limits.

Yet another object of the present invention is the provision of an improved pulp molding machine including a provision for allowing the water withdrawn through the molding form to flow downwardly throughout almost the entire period during which vacuum is applied to thereby remove moisture from the molded part more effectively.

Another object is the provision of duct means communicating with each mold to supply air under pressure for releasing finished parts therefrom, the ducts being located entirely above the mold so that moisture removed during the formation of the molded article will not enter said ducts.

A further object of the present invention is the provision of an improved molding machine including a provision for withdrawing moisture from the molded part through a first duct and for supplying air pressure for removing the part from the mold through a second set of ducts whereby relatively little moisture will be forced back into the molded part during the removal operation.

Another object of the present invention is the provision of an improved pulp molding machine including a means for changing the resting position of each mold carriage whereby articles of different vertical heights can be readily produced.

A further object of the present invention is the provision of an improved pulp molding machine wherein the height of the slurry tanks and washing tanks can be adjusted vertically to correspond with the resting position of the mold carriage.

Briefly stated, to the accomplishment of the foregoing and related ends a preferred form of the present invention provides an improved pulp molding machine including a supporting column or turret mounted for rotation about a vertical axis and having a plurality of molds mounted thereon for movement along vertical paths independently of one another. A first drive means is provided for rotating the turret intermittently through a predetermined arc to position the molds sequentially at a plurality of work stations and a second drive means is provided for raising and lowering the molds. The molds themselves are mounted for rotation about horizontal axes extending radially from the turret. A third drive means is provided for rotating the molds about the latter axes. Suitable control elements are also provided for automatically accomplishing the required movements and operation of the several parts.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 9 is a partial semidiagrammatic horizontal sectional view taken on line 9—9 of FIGURE 1;

FIGURE 10 is a side elevational view of a part of the control assembly according to the present invention;

FIGURE 11 is a vertical sectional view taken on line 11—11 of FIGURE 10;

FIGURE 15 is an end elevational view of the apparatus of FIGURE 14 partly in section;

FIGURE 18 is a side elevational view partly in section of the part removal air supply assembly according to the present invention;

FIGURE 19 is a vertical sectional view illustrating the washing tank lowering and raising mechanism of the invention;

FIGURE 21 is a partial side elevational view partly in section of the upper portion of the supporting turret illustrating the hydraulic fluid supply from the turret to the cam controlled hydraulic valves;

FIGURE 22 is a transverse horizontal sectional view taken on line 22—22 of FIGURE 1; and FIGURE 23 is a diagrammatic side elevational view partly in section of the hydraulic fluid supply for each mold.

Figure 1:
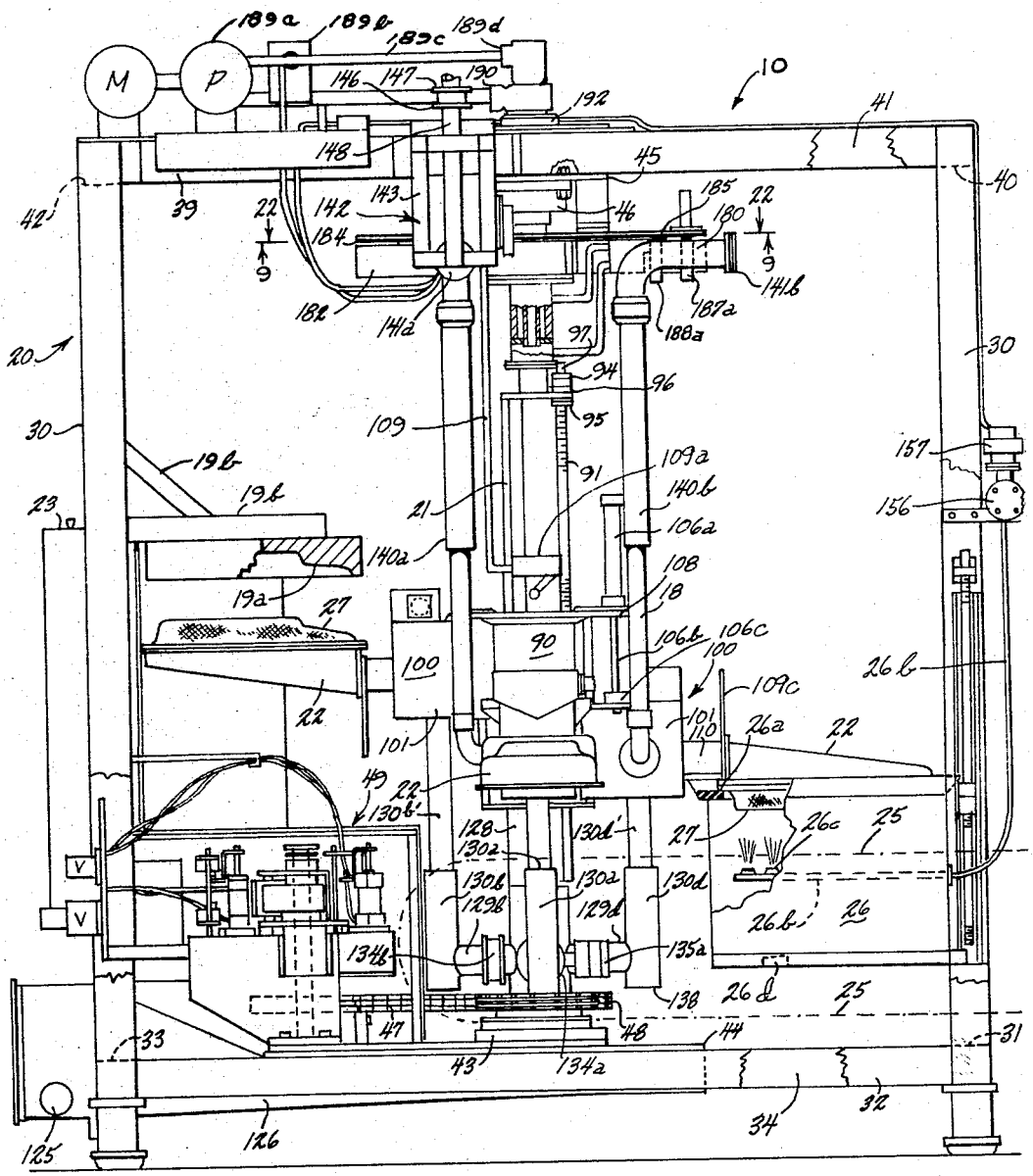
FIGURE 1 is a side elevational view of a molding machine embodying the present invention.

Referring now to the drawings there is shown a pulp molding machine 10 embodying the present invention. The main supporting element of the machine comprises a generally rectangular upright frame indicated generally at 20 upon which is journaled for rotation about a vertical axis a vertically disposed turret column 21. Four mold support housings 22 are mounted for rotation with the column 21 about a vertical axis and for vertical reciprocation thereon as will be described more fully hereinbelow. As can be seen in FIGURE 1, a control cabinet 23 is provided for housing electrical components used to regulate the sequencing control of the various machine movements. The operation of the control mechanism will be described more fully hereinbelow.

Figure 2:
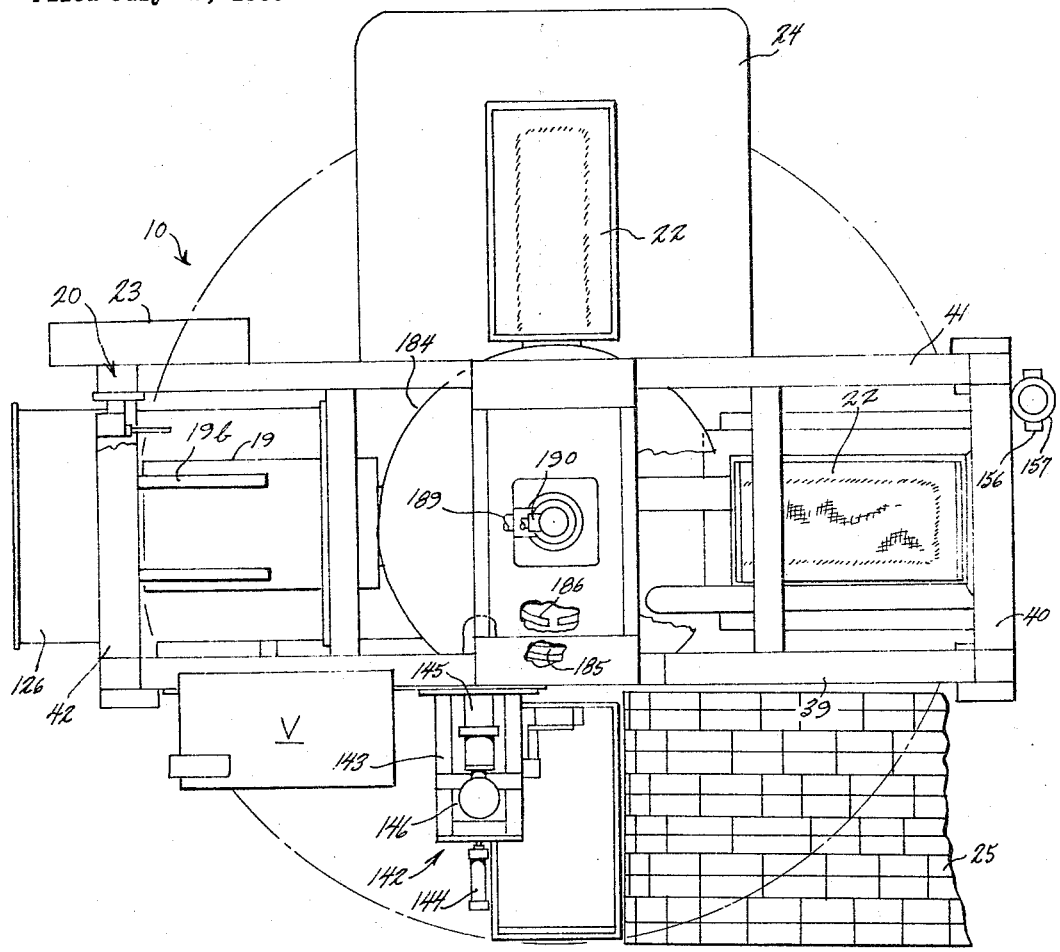
FIGURE 2 is a plan view of the molding machine.

Positioned circumferentially at 90° intervals about the turret column 21, as best seen in FIGURE 2, is a pulp slurry tank 24 and pressing frame 19 having a contoured interior 19a (FIGURE 1) which corresponds in curvature to the face of the mold. The pressing frame 19 is supported by means of suitable braces 19b which extend outwardly to the framework 20. Positioned at a 90° interval from the pressing frame 19 is an oven conveyor 25 indicated in solid lines in FIGURE 2 and in dotted lines in FIGURE 1. Positioned at a 90° interval from the oven conveyor 25 is a mold washing tank 26. The tank 26 is supported upon the framework 20 by a vertically adjustable support means as will be described more fully hereinbelow. Intermittent rotation of the turret column 21 will present the mold supports 22 sequentially to these four circumferentially spaced operating stations. The molds will remain at each station for a predetermined period of time before moving on to the next station.

Each of the mold supports 22 has mounted thereon a suitable foraminous contoured molding form of known construction indicated at 27. During operation, the forms 27 are sequentially presented first to the pulp slurry tank 24 for vacuum deposition of fibrous pulp materials suspended therein, next to the pressing frame 19 which can be considered optional and when used functions to press additional moisture from the part as the mold support and molding form 27 are forced upwardly against the inside surface of the frame 19a. Next the mold 27 is indexed to the drying oven conveyor 25 for transportation through the drying oven (not shown) and finally to the mold washing tank 26 where any material remaining on the surface of the molding form 27 is removed. It should be readily apparent that since each of the four molds are presented to different stations at the same time, one finished article is deposited on the drying oven conveyor 25 each time the turret column 21 is indexed through 90°.

SUPPORTING FRAMEWORK

As can be best seen by reference to FIGURES 1 and 2, the framework 20 consists of four horizontally disposed base members 31, 32, 33 and 34; four vertically disposed members 30 in a rectangular arrangement as seen from above and four horizontally disposed top members 39, 40, 41 and 42. Each of the frame members are rigidly connected at the corners by any suitable fastening means such as welding.

TURRET AND TURRET DRIVE MECHANISM

Figure 3:
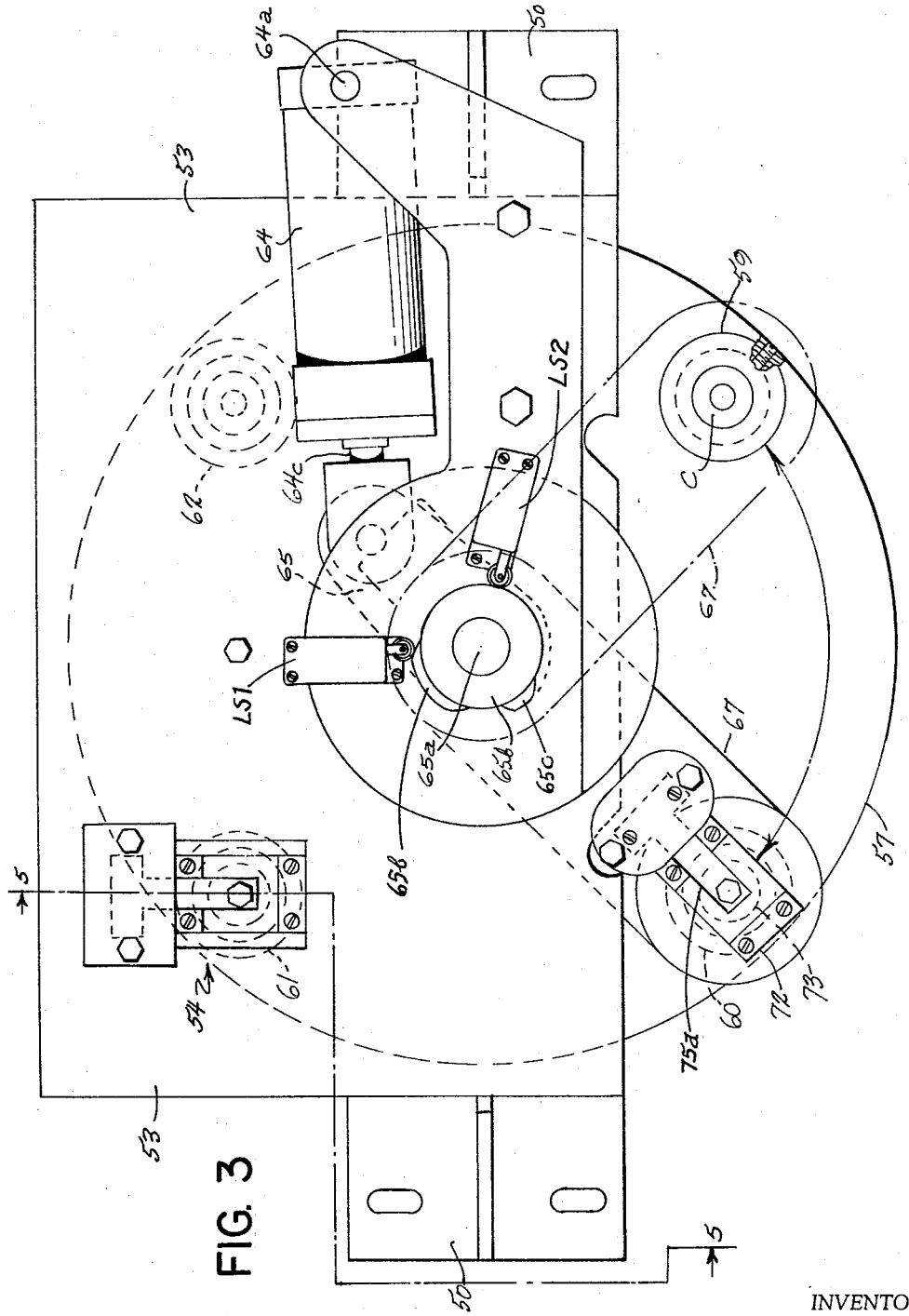
FIGURE 3 is a plan view of the turret indexing mechanism.
Figure 4:
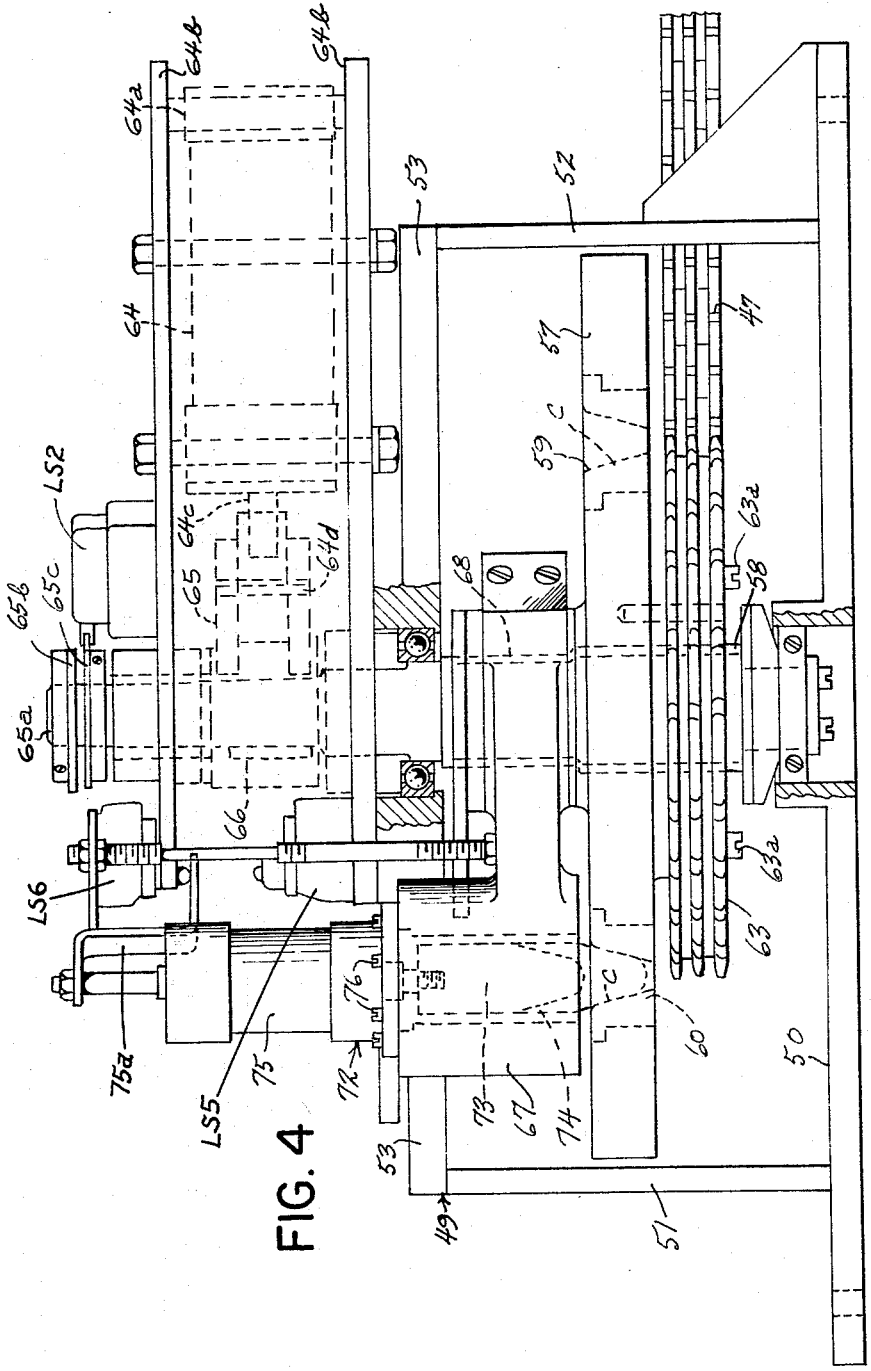
FIGURE 4 is a side elevational view partly in section of the turret indexing mechanism.
Figure 5:
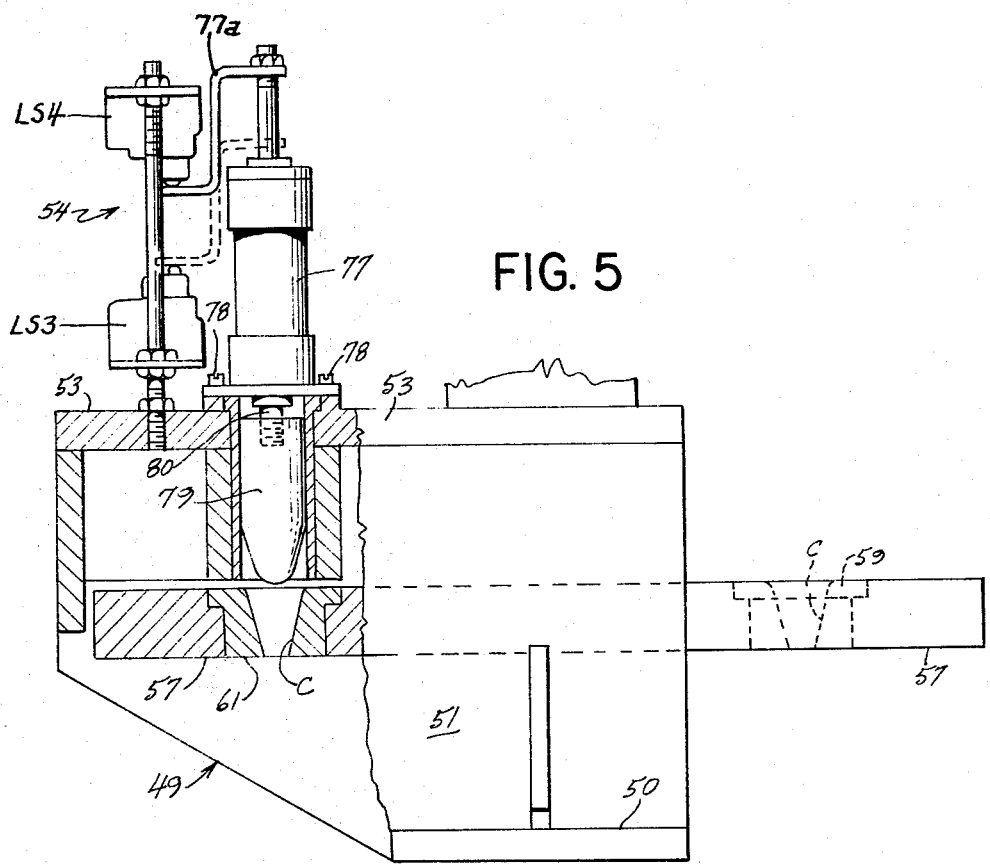
FIGURE 5 is a partial sectional view taken on line 5—5 of FIGURE 3.
Figure 6:
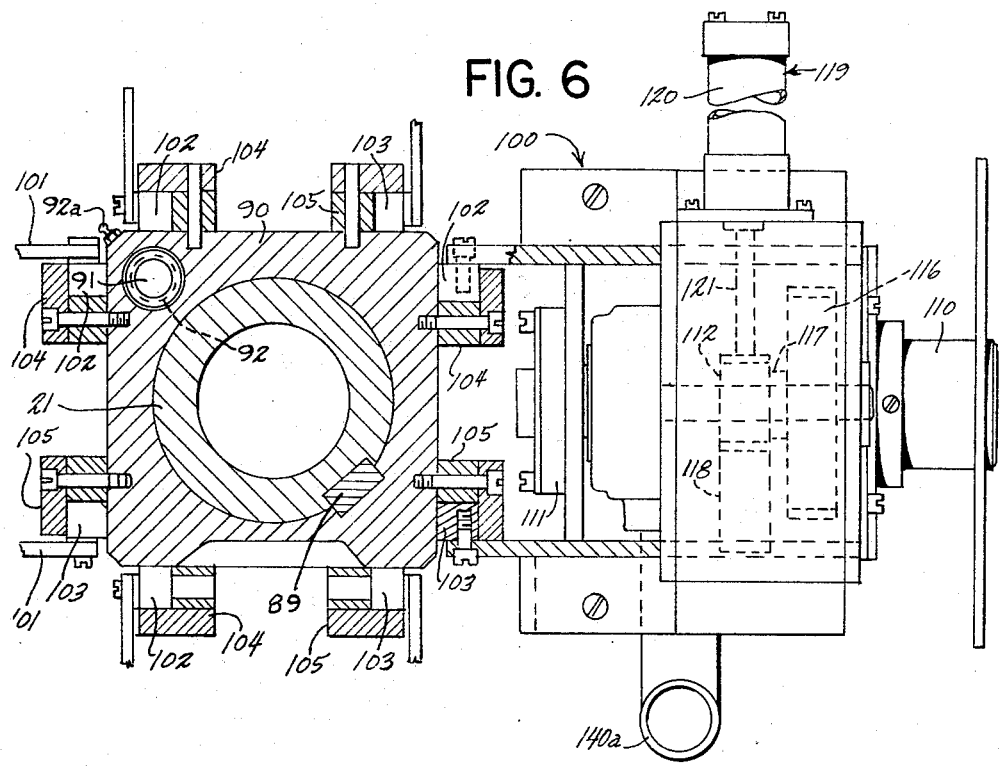
FIGURE 6 is a partial horizontal sectional view taken through the turret of the molding machine and one mold supporting carriage.

The turret column 21 as can be best seen in FIGURES 1, 6 and 21 is tubular and is journaled at its lower end within bearings 43, the latter being mounted upon a plate 44 secured in any suitable manner as by welding to the horizontally disposed frame members 32 and 34. A second plate designated 45 is suitably affixed to the lower surface of the horizontally disposed top members 39 and 40 to provide a support for a bearing 46 within which the upper end of the support column 21 is rotatably mounted. Rotary movement is imparted to the column 21 by means of a chain 47 entrained between a sprocket 48 which is secured to the bottom of the column 21 and a turret drive mechanism indicated generally at 49. As best seen in FIGURES 3, 4 and 5, the turret column 21 is indexed by means of a suitable drive means such as a hydraulic motor 64, which is coupled by means of a vertically disposed pivot pin 64a to a pair of support arms 64b projecting laterally from the drive mechanism and rigidly secured thereto.

As clearly shown in FIGURES 3 and 4 the motor 64 is provided with a connecting rod 64c secured by means of a pin 64d to a crank arm 65 mounted for rotation upon a vertical shaft 65a. The movement of the crank arm 65 is imparted to an index plate 57 as will be described more fully hereinbelow.

The turret drive mechanism 49 as best shown in FIGURE 4 is supported by means of a horizontally disposed base plate 50 secured to the two lower horizontal frame members 32 and 34 in any suitable manner as by welding. The turret drive frame also includes a pair of upright supports 51 and 52 and a top plate 53. A horizontally disposed and generally cylindrical index plate 57 is journaled as by a bearing 58 at its lower end upon the shaft 65a. Positioned circumferentially at intervals of 90° within the plate 57 are four hardened steel bushings indicated 59-62. Each of these bushings is provided with a frusto-conical opening C which tapers toward the bottom thereof. A drive sprocket 63 is secured to the plate 57 by means of a plurality of circumferentially spaced screws 63a to provide a drive connection between the column 21 and the motor 64 through the drive chain 47.

As explained briefly hereinabove, the driving force imparted to the index plate 57 is provided by means of a suitable power source such as hydraulic motor 64 through its connection with the crank arm 65. The arm 65 is keyed as by means of splines 66 to the shaft 65a. Secured to the shaft 65a by a key 68 is a lower crank arm 67. Actuation of the upper crank arm 65, drive shaft 65a and lower crank arm 67 will rotate the index plate 57 and sprocket 63 only when a connecting means indicated generally at 72 is operated so as to secure the lower crank arm 67 to the index plate 57.

As best seen in FIGURES 3, 4 and 5, the connecting means 72 includes a vertically disposed index pin 73 which is slidably mounted within a vertically disposed bearing 74 in the lower crank arm 67. A drive means is operatively connected to the pin 73 for moving the same along a vertical path. The latter drive means comprises a hydraulic motor 75 secured by suitable fasteners 76 to the upper surface of the lower crank arm 67. When the hydraulic motor 75 is actuated in a first direction, the pin 73 will be raised out of the frusto-conical opening C in one of the bushings 59-62 and when the motor 75 is actuated so as to lower the pin 73, the latter will pass into whichever of the bushings 69-62 is positioned beneath the end of the crank 68 thereby allowing the movement of motor 64 to be imparted to the plate 57. Rigidly secured to the plunger of motor 75 is a switch operating member 75a positioned to engage current control means such as lower and upper switches LS5 and LS6.

At the extreme upward end of the shaft 65a are provided a pair of vertically spaced cam members 65b and 65c. The cam 65b is adapted to engage a circuit control means such as a switch LS1. A similar switch LS2 is affixed in a position adapted to engage the cam 65c. The lobes of cams 65b and 65c are so constructed and positioned as to cause the respective switches to be actuated when the motor 65 reaches each end of its stroke for purposes described hereinbelow.

To index the column 21, the hydraulic motor 64 is actuated so as to rotate the upper crank arm 65 in a counterclockwise direction as seen in FIGURE 3 thereby moving the arm 67 from the solid to dotted line positions through a 90° angle. As this is done, the index pin 73 will be positioned within the plate 57. When indexing has been completed, the index pin 73 is retracted by operation of the hydraulic motor 75. Thereafter, the hydraulic motor 64 is actuated in a direction to retract the connecting rod 64c thereby returning the arms 65 and 67 to their original positions as shown in FIGURE 4. With the proper drive ratio between the sprockets 63 and 48, and between the hydraulic motor 67 and turret column 21, the turret column 21 will be caused to index intermittently through a 90° arc each time the motor 64 is actuated so as to extend the connecting rod 64c.

As can be best seen in FIGURES 3 and 5, a locking means 54 is provided for positively retaining the index plate 57 and turret column 21 against rotary movement when the molds are positioned at the operating stations referred to hereinabove. The locking means 54 includes a drive means such as a hydraulic motor 77 disposed vertically and secured in position by means of fasteners such as screws 78 to the plate 53. A suitable locking member such as a vertically disposed pin 79 is rigidly attached to the connecting rod 80 of the hydraulic motor 77. The lower end of the pin 79 is conically shaped and rounded at the tip so that it will be well adapted to enter the opening C within any of the bushings 59-63 in the plate 57. Secured to the plunger of motor 77 is a switch operating member 77a positioned to engage upper and lower current control means such as switches LS4 and LS3 respectively for purposes hereinafter described.

MOLD SUPPORTING CARRIAGE ASSEMBLY

As can be best seen in FIGURES 1 and 6, a supporting member such as a saddle 90 surrounds the turret column 21 and is mounted for vertical sliding movement thereon. The saddle 90 is prevented from rotation about a vertical axis with respect to the turret 21 by the key 89 which is rigidly secured to the turret column 21 and slidably associated with the saddle 90. Saddle 90 is adjustable in position vertically upon the turret column 21 by the provision of an elevating screw 91 located laterally of the column 21. As can be seen in FIGURE 6, the lower end of the elevating screw 91 is threaded through a nut 92 which is suitably secured to the saddle 90 against rotation and axial displacement. The threaded connection between the screw 91 and nut 92 can be lubricated as required by means of a grease fitting 92a which communicates with the interior of the nut 92 through a suitable duct (not shown). The screw 91 is rotatably supported at its upper end by bearings 94 and 95 which are mounted within a bracket 96 attached to the turret column 21. The upward end of the screw 91 is cut square at 97 so that a wrench may be used to rotate the screw as required for adjusting the vertical position of the saddle 90.

The mold support carriages 100 as can be best seen in FIGURES 1, 6, 7, 8 and 23, are four in number in the form of the invention illustrated. Each of the mold support carriages 100 comprises a generally rectangular housing 101 to which is attached a pair of vertically disposed way pieces or track members 102 and 103 adapted to slidably mate with a vertically disposed pair of way pieces or track following members 104 and 105 affixed rigidly to the saddle 90. As can be clearly seen in FIGURE 6, four pairs of way pieces or track following members 104 and 105 are provided upon the saddle 90 and each of the mold carriages 100 includes a pair of way pieces or track members 102 and 103 adapted to engage the way pieces or track following members on one side of the saddle. Since all four mold support carriages 100 are identical, only one carriage will be described in detail herein.

Each of the mold carriages 100 is supported for vertical sliding movement upon the saddle 90 and thus each carriage will be able to move independently with respect to the saddle. The vertical movement of the saddle by means of the screw 91 will, of course, adjust the vertical position of all of the mold support carriages simultaneously. In this way, molding forms 27 of different vertical heights can be used on the machine without changing the spacing between the oven conveyor and the bottom surface of the molded part when it is positioned for transfer from the mold onto the oven conveyor. The pulp slurry tank and the mold washing tank are provided with suitable vertical adjusting means so that the upper surfaces thereof can be made to correspond to the position of the mold in its lowermost position upon the saddle 90 in whatever vertical position the saddle has been placed.

Figure 7:
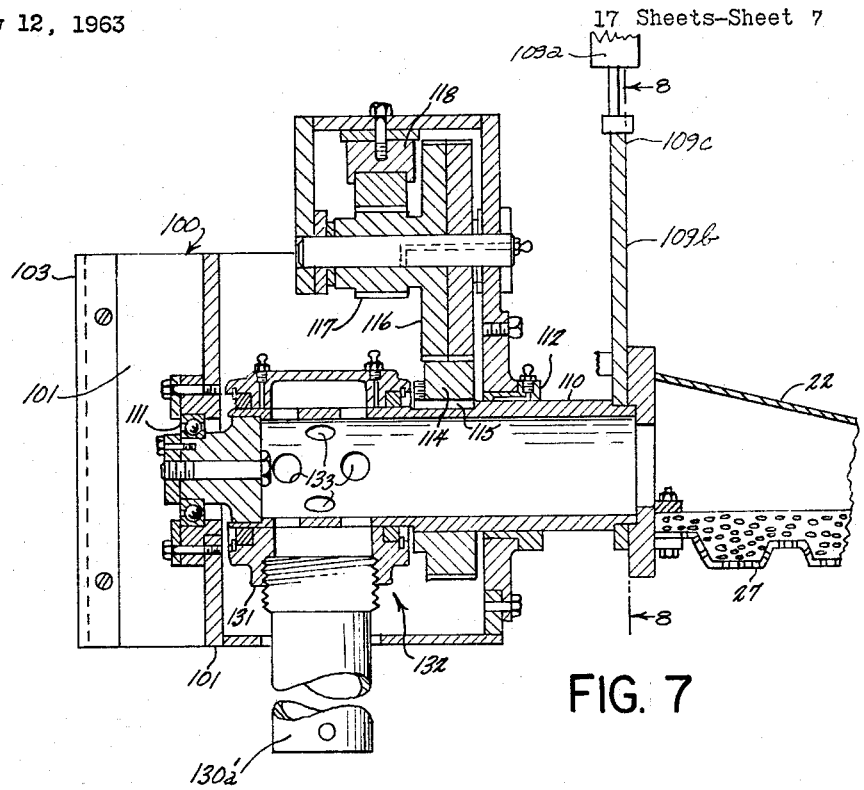
FIGURE 7 is a partial vertical sectional view of the support carriage and mold according to the present invention.

As can be clearly seen in FIGURE 1, an elongated vertically disposed member 109 extends downwardly from a portion of the framework 20 and has mounted on the lower end thereof a circuit control means such as a limit switch 109a. Rigidly affixed to the inward end of the mold support 22 is a cam plate 109b including a lobe 109c adapted to engage the switch 109a when the mold support 22 is indexed to the transfer station with the molding form 27 directed downwardly as shown in FIGURE 7. The limit switch 109a is conductively connected to the control cabinet 23 in any suitable manner so as to prevent lowering of the mold support 22 should support 22 be positioned with the form 27 facing upwardly when it arrives at the transfer station above the end of the conveyor 25. In this way, damage to molds is prevented due to improper engagement between the mold and the transfer mechanism to be described hereinbelow.

As can be best seen in FIGURES 1 and 23, a motive power means such as hydraulic motor 106a (only one of which is shown) is provided to move each of the mold support carriages vertically. Each of the four hydraulic motors 106a is identical and each is secured in a vertical position above each carriage 100 upon a plate 108 itself affixed to the top of saddle 90. Each hydraulic motor 106a includes a connecting rod 106b which is attached to the carriage housing 101 by means of a coupling 106c. Selective actuation of the hydraulic motors 106a serves to reciprocate the mold support carriages 100 vertically between two extreme positions determined by the limit of movement of the hydraulic motors 106a.

Figure 8:
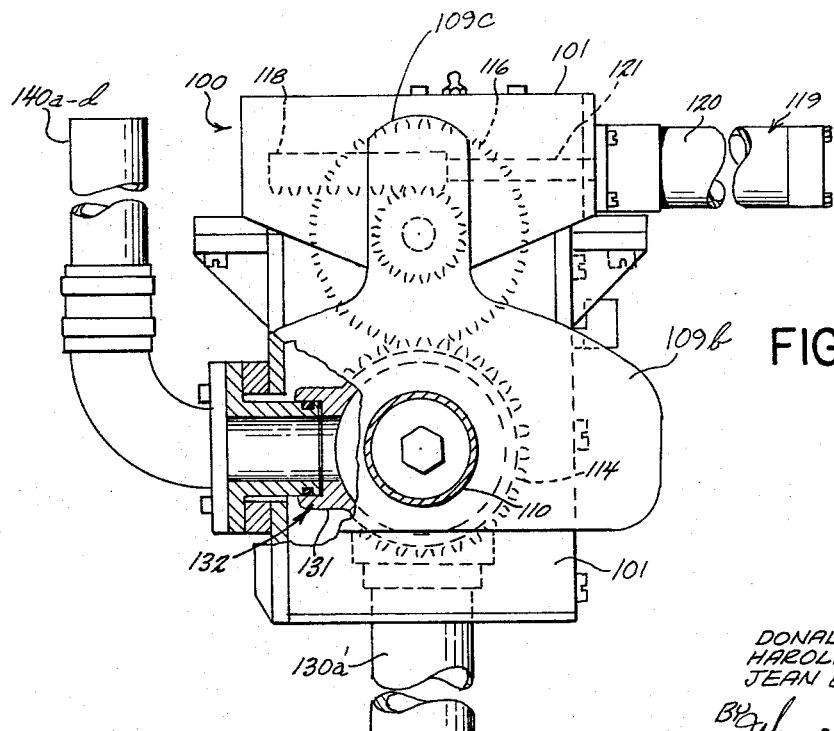
FIGURE 8 is a partial front elevational view partly in section taken on line 8—8 of FIGURE 7.

As can be best seen in FIGURES 6, 7 and 8, a support shaft 110 composed of a hollow tube is journaled for rotation about a horizontal axis in the housing 101 upon bearings 111 and 112. The outward end of the shaft 110 carries the mold support 22. Connected to the support shaft 110 is a gear 114 which is affixed thereto by a key 115. The gear 114 meshes with a second gear 116 integral with a smaller gear 117 which in turn meshes with a rack 118 mounted for horizontal reciprocation above the shaft 110. In this manner the horizontal reciprocation of the rack 118 is adapted to cause rotation of the support shaft 110 and thereby invert the mold plate 22. Reciprocatory power is provided for the rack 118 by a suitable motive power means such as hydraulic motor 119. The motor 119 includes a cylinder 120 secured to the housing 101 in a horizontal position and a piston rod 121 which projects into the housing 101 and is secured to rack 118.

It should be apparent from the above description that each of the molds is capable of three operational movements, the first of which is rotation about a vertical axis positioned at the center of the turret, the second being independent vertical reciprocation of each of the mold support housings 101 upon the saddle 90 and the third is rotation of each mold support 22 about a horizontal axis projecting radially from the mold support turret 21.

VACUUM SUPPLY SYSTEM

Figure 20:
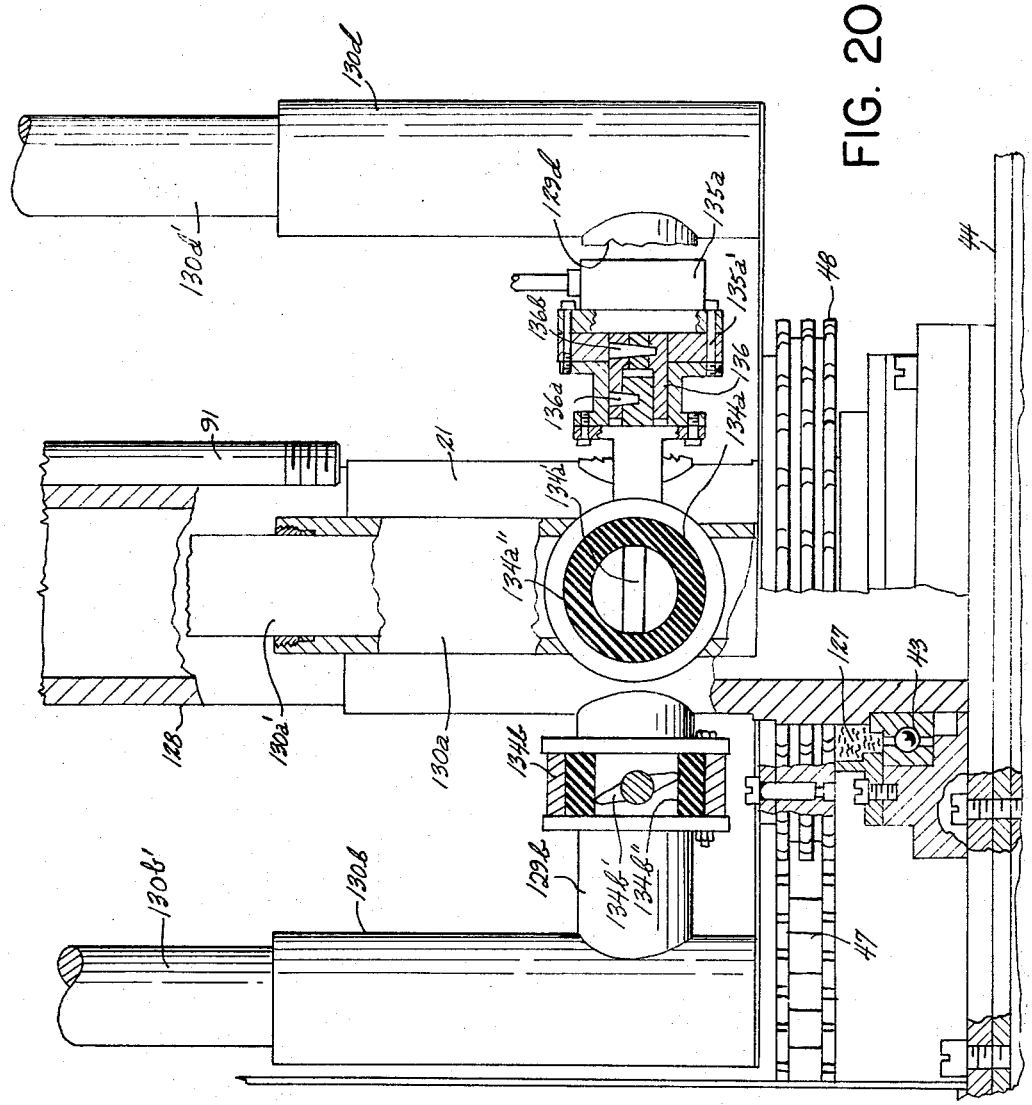
FIGURE 20 is a partial side elevational view partly in section of the lower portion of the turret and vacuum supply lines.

The vacuum used to deposite fiber onto the molds 27 is transferred from a source of vacuum (not shown) through a pipe 125 as seen in FIGURE 1 to a separator tank 126 positioned between the opposing horizontal frame members at the base of the frame. The separator tank 126 is connected by means of a rotary seal 127 (FIGURE 20) to the hollow lower section 128 of the turret column 21. Four supply pipes 129a–d project horizontally from the turret column 21 and communicate through the turret column 21 with the separator tank 126. These pipes are joined with four vertically disopsed tubes 130a–d including upper and lower telescopically related sections.

The upper sections designated 130a'–d' connect with the stationary members 131 of rotary couplings 132 provided within each mold support housing 101 (see FIGURE 7). Each shaft 110 is provided with a plurality of openings such as holes 133 which make possible communication between tubes 130a–d and the interior of the mold supports 22. In each horizontal pipe section 129a–d is mounted a shut off valve comprising a two position butterfly valve 134a–d which serves as a means to open and close the connection between the vacuum source and each mold. Suitable operating means such as hydraulic actuators 135a–d are connected to each of the valves 134a–d for opening and closing the valves responsive to the operation of the control system which is described hereinbelow.

Each of the butterfly valves 134a–d includes a generally disc shaped valve member 134a'–d' the respective edges of which are adapted to engage a hollow cylindrical and resilient sealing member 134a"–d" positioned within valves 134a–d. Each of the motors 135a is secured to the shaft of a valve member by means of a suitable coupling such as a sleeve 136 which extends between and is secured to the motor shaft and the shaft of the valve member by radially extending pins 136a and 136b.

PART REMOVAL SYSTEM

In order to selectively remove the finished parts from the molds, air pressure is supplied from a suitable source to each mold through a duct means which is separated physically from the ducts used for supplying vacuum to the mold. In the form of the invention shown in the drawings, the air supply ducts comprise telescoping vertically disposed and circumferentially spaced tubes 140a–d which are connected to a fixed member 131 of rotary coupling 132 in each of the mold support carriages as shown in FIGURE 8. The tubes 140a–d extend upwardly, bend outwardly and terminate as coupling members 141a–d whose axes extend radially from the turret 21.

A low pressure air coupling device 142 (FIGURES 1 and 18) is suitably attached to the supporting framework 20 by means of a bracket 143 which extends downwardly therefrom at the transfer station and is positioned to be coupled selectively to each of the coupling members 141a–d as each is indexed to the operating station adjacent the transfer mechanism.

The coupling device 142, as best shown in FIGURE 18, includes a motive power means such as a horizontally disposed hydraulic motor 144 affixed to bracket 143 which when energized causes a coupling duct 145 secured thereby to move toward the center of the turret 21 and into contact with whichever of the coupling members 141a–d is adjacent thereto. Secured to duct 145 is a flexible hose 146b which is connected in turn to a duct 146a. A second motive power means such as a hydraulic motor 146 is secured between pipe 146a and an air supply pipe 148. The pipe 148 is itself connected to a source of air pressure (not shown) to provide low pressure air for blowing off or releasing the part which has been produced on the molding form.

During operation, when it is desired to release a molded part from one of the molds 27 while the mold is positioned at the transfer station, the control panel 23 as described below will cause the hydraulic motor 144 to be energized thereby forcing the coupling duct 145 into contact with one of the members 141a–d. As this takes place, an axially adjustable valve operating means such as a bolt 145a affixed to duct 145 will project into the member 141a a sufficient distance to unseat a movable valve member 150 from a seat 150a therein. The valve member 150 is yieldably biased toward the seat by a suitable resilient element such as a spring 150b which is itself supported within each of members 141a–d upon a post 150c. In operation, the valve member 150 will remain in contact with the valve seat 150a until the coupling duct 145 has been moved to the position of FIGURE 18 at which time the member 145a will unseat the valve member 150. At other times the coupling member 141a will be reliably sealed by the valve member 150. Affixed to the outside surface of the valve seat 150a is a resilient sealing member such as rubber ring 150d which the free end of a duct 145 is adapted to contact when moved to the position of FIGURE 18.

The hydraulic motor 146 is then energized by suitable controls to open the valve 147 and allow communication between a source of air pressure through pipe 148, pipe 146a, flexible hose 146b and coupling duct 145. The coupling members 141a–d will then transmit pressure through the pipes 140a–d to the rotary coupling 132, as best seen in FIGURE 8. After the elapse of a selected time interval determined by the control panel 23, the motor 146 is actuated so as to close the valve 147. The motor 144 is then actuated to slide the member 145 outwardly or toward the right as seen in FIGURE 18 thus closing the valve member 150 and freeing the turret 21 for rotation.

Figure 14:
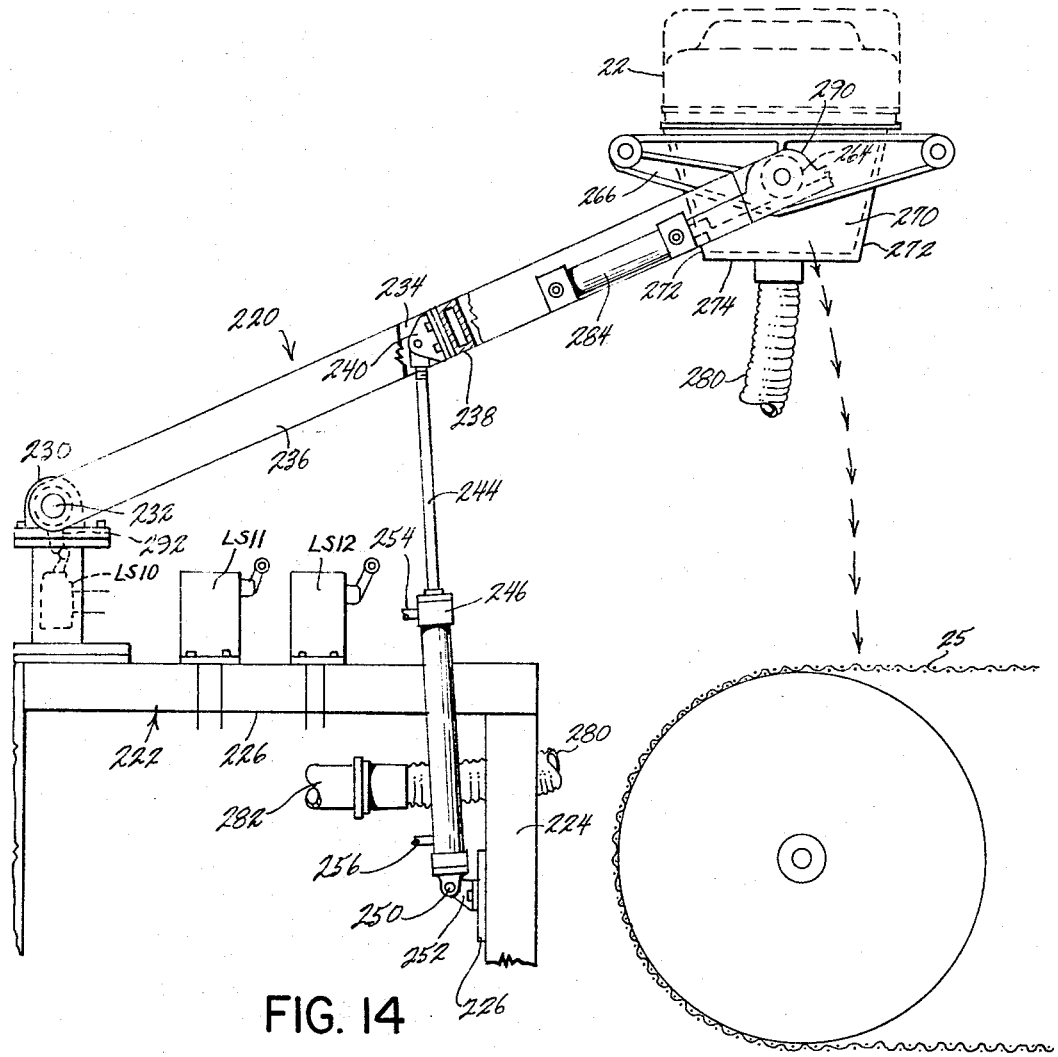
FIGURE 14 is a side elevational view partly in section of the part transferring mechanism of the invention.

As shown in FIGURES 14 and 15, a part transfer assembly 220 is provided for carrying the molded parts from the support 22 positioned at the conveyor or transfer station to the upper surface of the conveyor 25. The transfer assembly 220 comprises a support framework 222 of any suitable design including vertical members 224 and horizontal members 226. Upon the upward surface of the support framework 222 is provided a pair of upwardly extending and laterally spaced bearing blocks 228 and 230. Mounted upon the bearing blocks for pivotal movement about a horizontal axis is a support shaft 232 the ends of which project laterally from the bearing blocks 228 and 230.

Rigidly secured to the ends of the shaft 232 are a pair of inclined parallel and spaced apart support arms 234 and 236. Secured between the arms 234 and 236 is a cross member 238 to which bracket 240 is rigidly connected. Pivotally secured to the bracket 240 by means of a horizontally disposed pivot pin 242 is the connecting rod 244 of a suitable motive power means such as a hydraulic actuator 246, the lower end of which is pivotally secured with a horizontally disposed pin 250 to a support bracket 252 is in turn secured to a horizontal frame member 226 connected between a pair of uprights 224. The cylinder 246 is operated by supplying hydraulic fluid thereto through suitable flexible lines 254 and 256, the flow through these lines being regulated primarily by the control 23 which is to be described in detail hereinbelow.

Journaled for rotation upon the free ends of the arms 234 and 236 are a pair of coaxial pins 260 and 262, the pin 262 having a spur gear 264 rigidly secured thereto at its outward end. Suitably rigidly secured to the inward ends of the pins 260 and 262 are a pair of spaced parallel frame members 266 and 268 between which is rigidly secured a hollow transfer head 270. The transfer head 270 includes side walls 272, a bottom wall 274 and a foraminous top wall 276 (FIGURE 15) which is contoured to correspond in shape with the external surface of the molded part 278. Immediately preceding transfer the part 278 is positioned adjacent to the contoured molding form 27 as shown in FIGURE 15. At the moment the molded part 278 is transferred from the form 27 to the transfer head 270, air under pressure is supplied through the member 110 into the interior of the mold support 22 thereby forcing the part 278 away from the foraminous molding form 27. Simultaneously, suction is created within the transfer head 270 by the provision of a flexible vacuum line 280 which extends downwardly from the transfer head 270 to a vacuum duct connected with a suitable source of vacuum (not shown).

Rigidly secured to the outward edge of the arm 236 is a suitable drive means such as a hydraulic actuator 284 including a connecting rod 286 having a rack 288 secured to the free end thereof. The rack 288 is positioned to mesh with the spur gear 264 whereby the operation of the actuator 284 will impart rotary movement to the transfer head 270 about a horizontal axis thereby enabling the transfer head 270 to be inverted as the actuator 246 lowers head 270 onto the conveyor 25. The spur gear 264 and rack 288 are enclosed within a suitable casing 290.

Affixed to the framework 222 is a switch LS10 positioned to engage a cam 292 affixed to the center of shaft 232 when the transfer head 270 reaches its uppermost position. Secured to the frame 222 in position for actuation by arm 236 when the latter swings to its lowermost position are two switches LS11 and LS12. The operation of these switches will be described fully hereinbelow.

MOLD WASHING SYSTEM

As shown in FIGURES 1 and 19, a washing tank 26 including four side walls and a bottom wall is provided so that each mold can be cleaned so as to assure that the foraminous surface of each molding form is free from foreign material before passing into the pulp slurry tank. The mold carriages are lowered at the wash station into the wash tank 26 so that the peripheral portion of the mold engages the rectangular resilient sealing ring 26a which can be seen in FIGURE 1. After this has been done, a valve 156 communicating with a source of water under pressure is opened by a suitable drive means such as a hydraulic motor 157. When the valve 156 is opened, water will be forced under pressure into a pipe 26b and out through a plurality of nozzles 26c which serve to direct a spray of water upwardly onto the molding form 27 positioned thereabove within the wash tank 26. After the water has been directed onto the mold for a predetermined period of time, the valve 156 is again closed. A suitable drain 26d is provided in the tank to conduct off waste water and foreign material.

As can be clearly seen in FIGURE 19, a horizontally disposed wash tank support bar 28 is rigidly secured between vertical frame members at the end of the framework 20 above the tank 26. Extending downwardly from the cross member 28 on the inside edge of each of the vertical frame members 30 are a pair of vertically disposed rails 28a, only one of which is shown. Projecting laterally from the washing tank 26 beneath the cross member 28 are a pair of followers 28b which extend into and are slidably associated with the guide rails 28a. Upon the support bar 28 is provided a vertically disposed bearing 28c within which is mounted for rotation a vertical adjustment means such as a vertically disposed screw 28d. The screw 28d extends downwardly from the bearing 28c and is threaded through a nut 28e which is itself affixed to a crosspiece 28f extending laterally between the followers 28b and secured rigidly to the wash tank 26. The upward end of the screw 28d is provided with a square end 28g which can be grasped by a wrench and turned to either lower or elevate the tank 27 with respect to the frame 20 to thereby assure proper seating of the mold support 22 upon the resilient sealing member 26a (FIGURE 1).

CONTROL SYSTEM

Attention will now be directed to the control system that actuates the operational devices in desired sequence. It will be noted that each mold may be moved vertically and also may be rotated about a horizontal axis at each of the four operating stations by individual hydraulic actuators. Furthermore, each mold is connected to and disconnected from the vacuum source once in its trip among the four index stations. Control must also be provided for the actuators of the turret indexing mechanism, index pin and locking pin, the low pressure air mold release coupling and control valve and the mold wash water control valve.

Of the hydraulic actuators included in the machine, some are fixed and others move relative to the frame. Those that are fixed are the actuators used for turret indexing, turret index pin actuation, turret locking pin actuation, release air valve actuation, release air coupling actuation, and mold wash water actuation. The actuators for the vacuum valve and for mold support reciprocation and rotation all rotate with the turret. Furthermore, during operation the vacuum control and mold rotation must be controlled while the turret is at the operating positions and also during indexing.

The control system, best shown in FIGURES 10, 11, 12 and 13, combines electrical and hydraulic control components to operate the hydraulic motors previously described. Referring specifically to FIGURE 10, there is shown an electrical control panel 160 suitably mounted within control cabinet 23 for controlling the continuous production of pulp molded articles and deposition of completed articles onto the drying oven conveyor 25. Mounted on the control panel 160 are a plurality of control switches CS1–CS9 only eight of which (CS1–CS8) have been shown by way of example. These switches are actuated in a predetermined, adjustable sequence by a plurality of rotary cams, again eight being shown by way of example (161–168).

The cams 161–168 are affixed to rotatable cam shaft 169. The shaft 169 is rotated by a variable speed drive consisting of constant speed electric motor 170 and an adjustable speed control 171 of known construction driving a shaft 172 having sprocket 173 mounted thereon, the latter being connected as by chain 174 to sprocket 175 affixed to the cam shaft 169. Rotation of the motor 170 will thus cause rotation of cam shaft 169 and the cams thereon to actuate switches CS1–CS9.

As best seen in FIGURE 11, each cam includes two mating cam sections which are relatively angularly adjustable to each other so that the length and positions of the raised portions relative to the cam shaft 169 can be adjusted to vary the sequence and duration that switches CS1–CS9 are closed.

Figure 17:
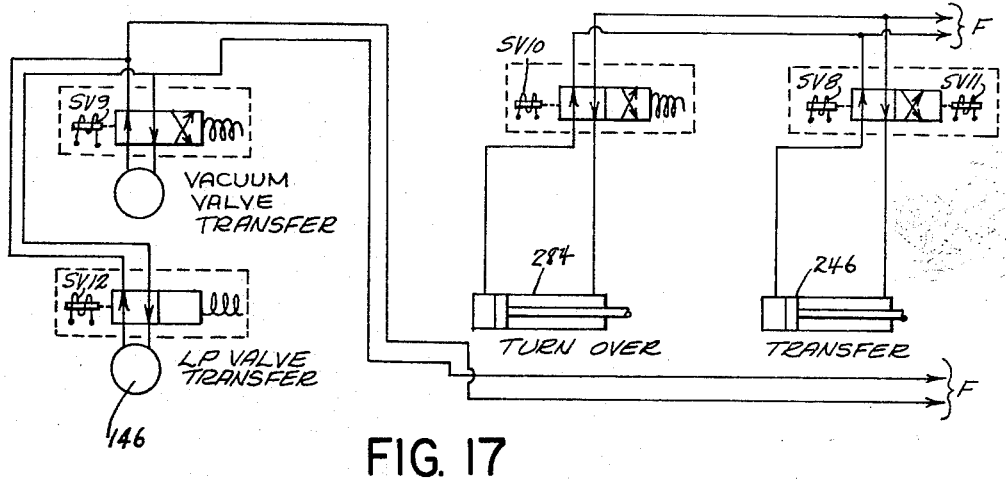
FIGURE 17 is a schematic diagram illustrating a portion of the hydraulic control circuitry of the invention coupled at F in FIGURE 12.
Figure 12:
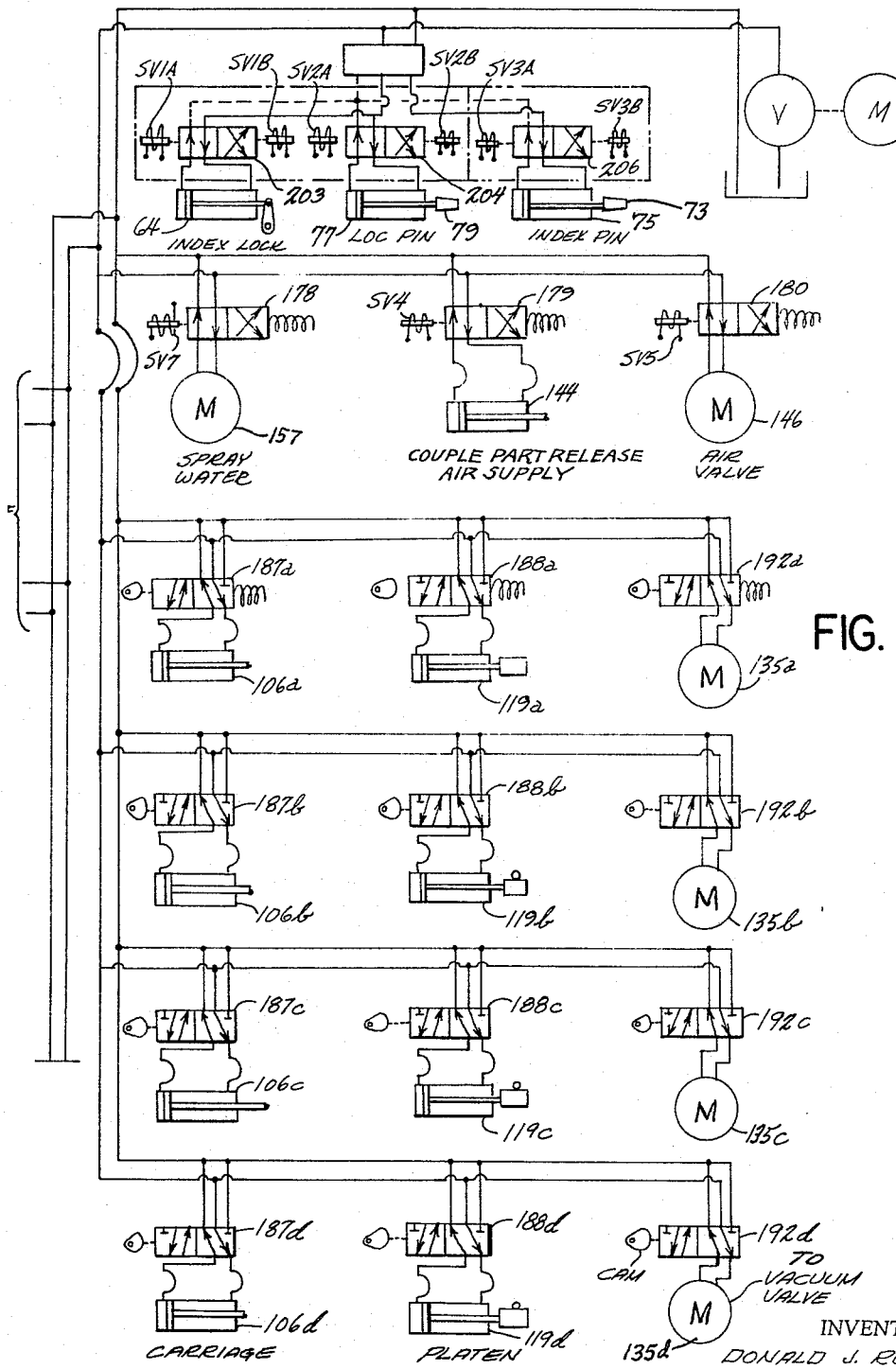
FIGURE 12 is a schematic diagram of a portion of the hydraulic control circuitry according to the present invention.
Figure 13:
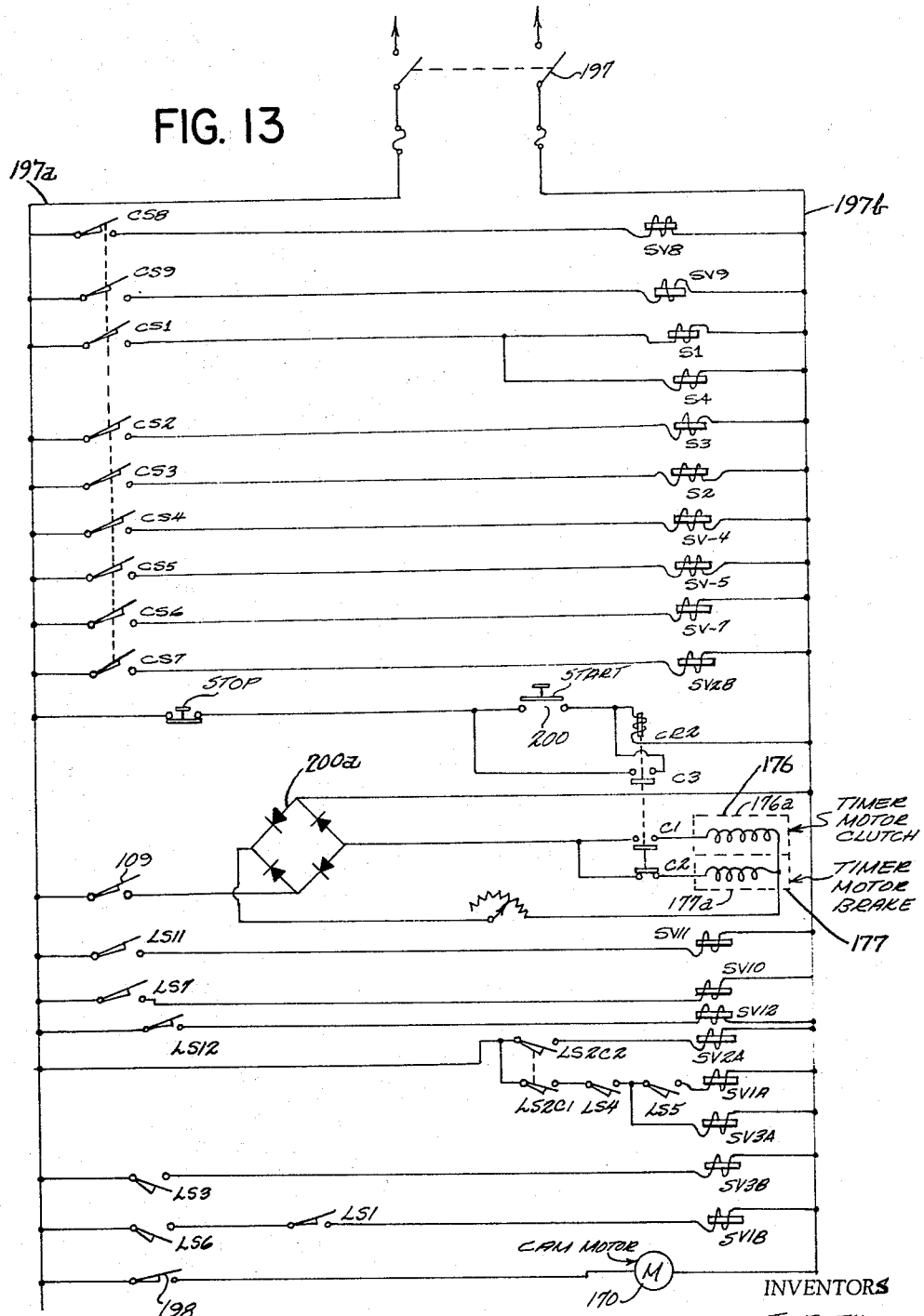
FIGURE 13 is a schematic wiring diagram of the electrical control system of the invention.

Referring to the electrical schematic diagram of FIGURE 13 and the hydraulic schematic diagram of FIGURES 12 and 17, it will be seen that current is supplied through a switch 197 to a pair of conductors 197a and 197b across which are wired a plurality of switches having the prefix CS for cam operated switches or LS for limit switches in series with a plurality of solenoids indicated by the prefix S.

The cam operated switches CS1–CS9 function to control the energization of four solenoids S1–S4, the solenoid SV4 connected to valve 179, solenoid SV5 connected to valve 180, solenoid SV7 connected to valve 178, solenoid SV2B connected to a valve 204, solenoid SV8 connected to the cylinder 246 so that when operated the transfer head 270 will move downwardly, solenoid SV9 connected to initiate and interrupt the vacuum supplied to the transfer head through duct 282. As indicated, switches CS1–CS9 are normally open and are closed by the adjacent cam.

The electrical control circuit also includes a plurality of limit switches LS1–LS7 which are located upon the machine in position to be actuated by the various hydraulic motor operated machine elements as shown in FIGURES 1, 3, 4, 5 and 14, control the machine operation responsive to the position of these machine elements. The closing of limit switches LS1–LS7 causes selective energization of solenoid windings SV1A and SV1B connected to valve 203, solenoid SV2A connected to valve 204, and solenoids SV3A and SV3B connected to valve 206 and solenoid SV10 operatively connected to motor 284 to selectively actuate hydraulic motors 64, 77 and 75 which serve to index the turret, position locking pin 79, and position pin 73 and operate the cylinder 284 respectively. Additional limit switches LS11 and LS12 operate solenoids SV11 and SV12 respectively which are operatively connected to actuate cylinders 246 and actuator 146 respectively. The windings 176a of a magnetic clutch 176 and the windings 177a of a magnetic brake 177 which controls operation of cam shaft 169 are selectively energized by contacts C1 and C2 respectively of relay CR2. Since all of solenoid windings and switches are fixed with respect to the machine frame, no slip rings or other provisions are needed to transmit electrical current from a stationary source to a rotatable element.

As described briefly above, three hydraulic motors are associated with each mold carriage and rotate with the turret column. As best shown in FIGURE 23, these are the motors 106a–d for vertically reciprocating the mold support carriages, motors 119a–d for rotating the mold supports, and motors 135a–d for operating the four vacuum valves 134a–d. To eliminate the need for either slip rings, electrical control lines or a complex, multi-pressure hydraulic rotary coupling, a novel fluid system has been devised, as best seen in FIGURES 9, 22 and 23.

Twelve cam operated, spring return hydraulic valves 187a–d are operatively connected to hydraulic motors 106a–d, valves 188a–d are operatively connected to control hydraulic motors 119a–d and valves 192a–d are operatively connected to control hydraulic motors 135a–d. These valves are for rotation on identical manifolds 180b–183b affixed to radially extending arms 180–183. A cam plate 184, FIGURES 1 and 9, mounted above and parallel to the plane of the valves 192a–d supports four solenoids S1–S4 and two semi-circular cam tracks 185 and 186, best seen in FIGURES 9 and 21, and are adapted to selectively depress the twelve valves. Solenoids S1, S3 and S4 operate to depress the spools of valves 187a–d for raising and lowering carriages. The cam track 185 operates the spools of valves 188a–d to control rotation of the mold supports. As shown in FIGURE 9, the four solenoids S1–S4 operate through four holes 193–196 provided in cam plate 184.

It should thus be apparent that solenoids S1–S4 can be selectively energized while the turret column 21 is positioned with each mold located at an operating station to actuate associated valves thereby causing the mold carriages to reciprocate vertically and control the application of vacuum to the molds. Furthermore, the cams 185 and 186 will actuate the associated valves while the turret column is being indexed so as to invert the mold supports and to continue the application of vacuum to the molds. The cams 185 and 186 may be proportioned as required to initiate and release the hydraulic valves as desired.

Hydraulic pressure is supplied through the turret column 21, from a source of fluid pressure such as pump 189a communicating with a reservoir 189b through a duct 189c to a rotary seal 189d and return through concentric rotary seal 190. The rotary seals 189 and 190 serve to transmit fluid to and from the twelve valves 187a–d, 188a–d and 192a–d through the provision of a duct 191a which extends downwardly from seal 189d and communicates with a high pressure chamber 191b to which are connected radially extending pressure lines 180a–183a, best seen in FIGURES 21 and 22. The outward ends of these lines communicate with manifolds 180b–183b affixed to the respective arms 180–183. Connected between the manifolds 180b–183b and the turret outwardly of the duct 191a are four return lines 180c–183c. Thus, the two pressure hydraulic couplings 189d and 190 handle all of the hydraulic fluid, both pressure and return, for the three hydraulic motors associated with each carriage.

Referring specifically to FIGURES 12 and 13, it will be seen that closing switch 197 will energize the control panel and switch 198 will control operation of motor 170, and start switch 200 will control electrical energy to a D.C. rectifier 200a. The start switch 200, when closed, allows energization of control relay CR2 to energize clutch winding 176a and deenergize brake winding 177a through the relay contacts C2 and C1 thus causing the cam shaft 169 to rotate. Switch 200 seals itself in through contacts C3.

With the clutch 176 energized, brake 177 deenergized and motor 170 running, cam shaft 169 will be rotated. Closing of switch CS1 by cam 161 energizes solenoids S1 and S4 at the mold and wash stations which depress plungers of two of the valves 187a–d which connect two of the motors 106a–d with hydraulic pressure to move two of the mold carriages downward. Closing of switch CS2 by cam 162 energizes solenoid S3 which depresses the spool of a valve 187a–d at the transfer station to connect a motor 106a–d to hydraulic pressure and move a mold carriage downward at that station. Closing of switch CS4 energizes solenoid SV4 associated with valve 179 to operate hydraulic motor 144 to couple low pressure air supply to telescoping tube 140. Closing of switch CS5 energizes solenoid SV5 associated with valve 180 to operate hydraulic motor 146 to apply air pressure to release the molded part from the mold. Closing of switch CS6 energizes solenoid SV7 associated with the valve 178 to operate hydraulic motor 157 to open the spray water valve 156. Closing of switch CS7 energizes solenoid SV2B associated with valve 204 to operate hydraulical motor 77 to remove locating pin 79.

Solenoid winding SV1A and SV1B of valve 203, SV2A of valve 204, and SV3A and SV3B of valve 206 are controlled by a number of limit switches LS1–LS6 actuated by the positions of the various movable elements of the machine. The function of this circuit is to cycle the turret indexing and locking device to sequentially position turret column 21 to the various operating stations.

OPERATION

Figure 16:
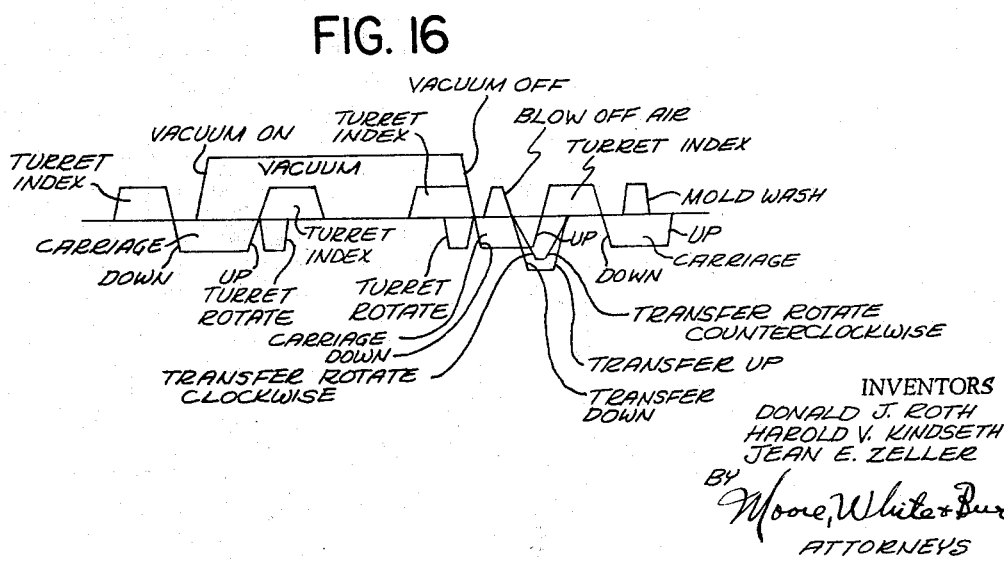
FIGURE 16 is a graph illustrating the operational steps which occur in a single mold during a complete cycle of operation with time being plotted on the horizontal axis from left to right.

In order to describe the operation it will first be assumed that a foraminous mold 27 is attached to each of the mold supports 22 and that the pulp slurry tank has been filled with a suitable aqueous pulp suspension such as paper fibers. The vacuum and low pressure air lines are charged to their required pressures, and the hydraulic system is connected with a source of pressurized fluid. It will be assumed that the indexing of the turret column 21 has just been completed with the index pin 73 pulled out of the plate 75 and the locating pin 79 in the engaged or downward position. It will also be assumed that the crank arms 65 and 67 are returned so that limit switches LS2 (contacts C2), LS3, LS4 and LS6 are closed and limit switches LS1, LS2 (contact C1) and LS5 are open. It will be assumed further that all cam operated switches CS1–CS7 are held open by cams 161–167. The switches 197, 198 and 199 will be closed so that the control panel is energized with the motor 170 running. The operations which occur in a single mold can be best seen by reference to FIGURE 16.

The start button 200 is depressed to energize relay CR2 thus opening contacts C2 to deenergize brake 177, closing contacts C1 and C3 to seal in relay CR2. Thus, cam shaft 169 rotates cams 161–168 to selectively allow the cam switches CS1–CS9 to close. As described hereinabove, the sequence and duration of the cams switch closings can be adjusted somewhat to vary the sequence and timing of the various operations.

For this discussion it will be assumed that the cam switches are closed in the sequence to permit describing the operation at one station completely before describing operations at the next station. It can readily be seen that the operations can be performed simultaneously or, if preferred, in an order different from that which is to be described. Moreover, the cams can be adjusted to yield an optimum operating cycle for the particular part which is being produced at any given time.

As the cam shaft 169 rotates, the cam switch CS1 will be closed to energize solenoid S1 which in turn depresses a spool of one valve 187a–d positioned thereunder to pressurize one of the motors 106a–d and lower the mold carriage such that the mold enters the pulp slurry tank 24. The closing of cam switch CS3 energizes solenoid S2 which in turn depresses one of the valves 192a–d to cause actuation of associated hydraulic motors 135a–d and open one of the vacuum valves 134a–d to apply a vacuum across the foraminous mold in the slurry tank.

Subsequent opening of cam switch CS1 deenergizes solenoid S1 allowing spring return of the valve spool of associated valve 187a–d resulting in application of hydraulic pressure to the reverse side of one hydraulic motor 106a–d to elevate the mold carriage. Cam switch CS3 is held closed until just before indexing of the turret column has begun to assure that vacuum pressure will be applied uninterrupted until the particular mold reaches the transfer station. It will be recalled that the cam 186 on cam plate 184 is provided to depress the spool of valves 192a–d to cause vacuum to be applied during the turret indexing. Cam switch C3, however, will be opened at the appropriate time to deenergize solenoid S2.

Closing of cam switch CS2 energizes solenoid winding S3 to depress the spool of the valve 187a–d at the transfer station positioned thereunder to apply hydraulic pressure to the associated hydraulic motor 106a–d and lower the associated mold carriage. Closing of cam switch CS4 energizes solenoid winding SV4 of valve 179 to apply hydraulic pressure to motor 144 and connect coupling duct 145 to coupling member 141a–d in the low pressure air line. The closing of cam switch CS5 results in energizing solenoid winding SV5 of valve 180 to apply hydraulic pressure to motor 146 which opens valve 147 to apply low pressure air to the associated mold and release the molded article therefrom. Subsequent opening of cam switches CS2, CS5 and CS4 will result in elevating the mold carriage at the transfer station, closing valve 147 to stop flow of low pressure air, and uncoupling of the low pressure air supply, respectively.

The closing of cam switch CS1 also energizes solenoid S4 at the mold washing station which depresses the spool of valves 187a–d positioned thereunder to apply hydraulic pressure to the associated hydraulic motors 106a–d to lower a mold into the wash tank 26. Cam switch CS6 is then closed to energize solenoid SV7 to actuate hydraulic valve 178 and apply pressure to hydraulic actuator 157 to turn on the mold wash water. Subsequent opening of cam switches CS6 and CS1 will turn off the mold wash water and elevate the mold carriage at the wash station.

The turret index cycle is initiated by closing of cam switch CS7 which causes solenoid SV2B of valve 204 to be energized so as to apply hydraulic pressure to motor 77 and retract locating pin 79. When this happens, limit switch LS4 is closed to allow energization of solenoid winding SV3A of valve 206, through LS2C1 and LS4, and apply hydraulic pressure to motor 75 and insert index pin 73 into a hole in index plate 57. With the index pin in place, switch LS5 closes to energize solenoid SV1A of valve 203 through switches LS2C1, LS4 and LS5 to index the turret column through 90° by hydraulic motor 64. When indexing is complete, contacts C1 of switch LS2 are opened to deenergize solenoid windings SV1A of valve 203 and SV3A of valve 206, and contacts C2 of switch LS2 closes to energize solenoid winding SV2A of valve 204 to position locating pin 79 in a hole in index plate 57. Limit switch LS3 then closes thus energizing solenoid winding SV3B of valve 205 to retract index pin 73. Switch LS6 closes when index pin 73 retracts to cause energization of solenoid winding SV1B of valve 203 to return index crank arms 65 and 67. With the crank arms returned, switch LS1 is opened so as to de-energize SV1B. The index cycle is then stopped automatically due to the positions of the limit switches and remains stopped until cam switch CS7 is again closed. When the crank arm is returned LS1 also opens de-energizing SV1B which stops plate 57.

While the indexing of the turret column is taking place, the cam 186 depresses the spool of one or more of the valves 192a–d so as to continuously apply vacuum to the mold from the time the mold leaves the forming station until just before it reaches the transfer station.

Similarly, cam 185 serves to depress the spool of one or more of the valves 188a–d to apply hydraulic pressure to the associated motors 119a–d and invert the mold suports such that the molded article is above the mold support and gravity assists removal of water from the mold. In the preferred embodiment shown in the drawings, each mold is inverted just after it leaves the forming station and remains inverted until just before it arrives at the transfer station.

The arms of the transfer apparatus are normally in the raised position. When CS8 is operated, solenoid SV8 which is operatively connected to the motor 246 will cause the transfer head to be lowered. Switches LS11 and LS12 which are connected respectively to SV11 and SV12 and they in turn to the motor 246 and to the air supply duct 282 respectively cause the motor 246 to elevate the transfer head 270 and allow low pressure air to be admitted to duct 282 and head 270 for releasing the molded part therefrom. The switch LS10 which is operatively connected to the motor 284 is actuated as the arms first begin to move downwardly thereby rotating the head 270 so that the finished part thereon faces the conveyor 25 when the arms reach their lowermost position.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A pulp molding apparatus comprising in combination, a supporting framework, a turret mounted vertically upon said framework for rotation about a vertical axis, a plurality of support members mounted for vertical sliding movement between limits upon said turret, motive power means operatively connected between each of said support members and said turret for imparting vertical reciprocatory movement to said support members, a foraminous mold secured to each of said support members, a drive means for inverting each of said molds and a pulp slurry tank mounted laterally of said turret in a position to receive each of said molds successively when said support members are lowered relative to said turret.

2. The apparatus of claim 1 wherein control means is provided for adjusting the time interval between movement of said support members relative to the turret and said operation of said drive means for inverting each mold.

3. The apparatus according to claim 1 wherein each of said molds are mounted for rotation upon said support members about axes extending radially of said turret.

4. The apparatus according to claim 1 including means for adjusting said limits of said vertical sliding support members wherein the resting position of each of said support members can be adjusted vertically.

5. The apparatus according to claim 1 wherein a saddle is mounted upon said turret for vertical adjustment thereon and wherein each of said support members is mounted for independent vertical sliding movement relative to said saddle.

6. The apparatus according to claim 14 wherein said motive power means comprises a hydraulic actuator, control means are provided for selectively operating said hydraulic actuator comprising a valve means communicatively connected to a source of fluid pressure and to said hydraulic actuator, and a cam means is mounted rigidly upon said frame in a position to engage said valve means for opening and closing said valve responsive to the rotation of said turret.

7. The apparatus according to claim 6 wherein said cam means comprises an arcuate cam member mounted above said turret concentric with the axis thereof and wherein said valve means includes a follower extending upwardly therefrom and spaced the same distance from said turret axis as said cam member.

8. In a machine for molding articles by vacuum deposition of fiberous pulp onto a foraminous mold, the combination of a rotatable turret, a drive means for rotating said turret to a plurality of circumferentially spaced operating stations, a pulp container, a mold support means mounted for vertical movement upon said turret, a drive means for moving said mold support means vertically with respect to said turret, a foraminous mold mounted upon said mold support and a motor mounted upon said support means and operatively connected to said foraminous mold for imparting rotation thereto.

9. The apparatus according to claim 8 wherein four of said operating stations are provided, one of said stations comprising a forming station located at the position of said pulp container, another of said stations comprising a mold washing station and a third of said stations comprising a transfer station wherein articles formed on the mold are removed therefrom.

10. The apparatus according to claim 8 wherein a first duct means communicates with each of said molds for supplying vacuum thereto, a second duct means communicates with each of said molds to supply air under pressure thereto, and wherein valve means are operatively connected to each of said duct means for controlling the flow of air therethrough.

11. A pulp molding machine for use with a source of vacuum comprising in combination, a supporting framework, a vertical column journaled for rotation on said framework, drive means for imparting rotation to said column, a saddle mounted upon said column for vertical movement, adjustment means for changing the position of said saddle upon said column, a support carriage journaled for vertical sliding movement upon said saddle, drive means mounted upon said saddle and connected to said carriage for imparting reciprocation thereto, a mold support journaled for rotation upon said support carriage about an axis extending radially therefrom, a drive means operatively connected to said mold support for imparting rotary movement thereto with respect to said support carriage, a foraminous mold secured to said mold support and movable therewith, duct means communicating between said mold and said source of vacuum, control means for energizing each said drive means in predetermined sequence to index said column to a predetermined operating station, change the vertical position of said support carriage, rotate said mold support about said radially extending axis and selectively connect said source of vacuum with said foraminous mold.

12. A pulp molding machine for use with a source of vacuum comprising in combination, a supporting framework, a turret mounted for rotation upon a vertical axis upon said framework, drive means for rotating said turret, a saddle mounted upon said turret for vertical sliding movement, means for changing the vertical position of said saddle, a carriage slidably mounted upon said saddle for movement vertically thereof, a first motor for vertically reciprocating said carriage, a mold support member journaled for rotation upon said carriage, a second motor for rotating said mold support member about a horizontal axis relative said carriage, a foraminous mold secured to said mold support member and movable therewith, means for connecting said mold with said source of vacuum, a control means connected to said first and second motors, regulating means for operating said control means, said regulating means being mounted upon said framework for engagement with said control means when said turret is in selected rotational positions.

13. A pulp molding machine comprising in combination, a supporting framework, a vertical column journaled for rotation upon said framework, motor drive means mounted for rotation upon said column, a saddle mounted upon said column, means for changing the vertical position of said saddle, a plurality of carriages slidably mounted upon said saddle, a fluid pressure motor operatively connected to each said carriage for imparting vertical movement thereto, a hollow mold support member journaled for rotation upon said carriage, a second fluid pressure motor operatively connected to said hollow mold support member for rotating said hollow mold support member about a horizontal axis, a foraminous mold secured to said hollow mold support member and movable therewith, a source of vacuum communicating with said mold through said hollow mold support member, a control means for operating said first and second fluid motors, said control means comprising valve means associated with each of said motors for selectively applying fluid pressure to each, timed means for operating said valve means in sequence for vertically reciprocating said carriages, rotating said mold support and connecting said mold support with said source of vacuum, said valve means being rotatable with said vertical column, timed means for operating said valves selectively at predetermined operating stations and for operating said turret drive means intermittently, cam means rigidly mounted upon said frame for actuating selected ones of said valve means during rotation of said turret.

14. The apparatus according to claim 13 wherein said timed means includes a plurality of switches, a rotatable cam means for operating said switches and a drive means for rotating said cam means.

15. A pulp molding machine comprising in combination a supporting framework, a turret mounted thereon for rotation about a vertical axis, a molding form mounted upon said turret for vertical movement, driving means for rotating said turret and for raising and lowering said molding form, a first duct means communicating with said molding form and positioned entirely thereabove for supplying air under pressure to said molding form to facilitate the removal of parts therefrom, a second duct means communicating with said molding form and positioned entirely below said molding form to supply vacuum thereto for depositing said pulp upon said molding form.

References Cited by the Examiner

UNITED STATES PATENTS 1,966,471  7/1934  Walters _____ 162—392

FOREIGN PATENTS 651,205  3/1951  Great Britain.
657,486  9/1951  Great Britain.

DONALL H. SYLVESTER, *Primary Examiner.*

J. H. NEWSOME, *Assistant Examiner.*